United States Patent
Rassaian et al.

(10) Patent No.: US 10,095,818 B2
(45) Date of Patent: Oct. 9, 2018

(54) STRENGTH PREDICTION SYSTEM AND METHOD FOR COMPOSITE LAMINATES

(71) Applicant: The Boeing Company, Chicago, IL (US)

(72) Inventors: Mostafa Rassaian, Bellevue, WA (US); Jonathan H. Gosse, Issaquah, WA (US); Andrew E. Parrish, Bellevue, WA (US); Michael J. Graves, Seattle, WA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 14/611,030

(22) Filed: Jan. 30, 2015

(65) Prior Publication Data
US 2016/0224698 A1 Aug. 4, 2016

(51) Int. Cl.
*G06F 17/50* (2006.01)
(52) U.S. Cl.
CPC ...... *G06F 17/5009* (2013.01); *G06F 17/5018* (2013.01); *G06F 2217/44* (2013.01)
(58) Field of Classification Search
CPC ....... G06F 17/50; G06F 2217/44; G01B 3/44; G01B 5/30
See application file for complete search history.

(56) References Cited

U.S. PATENT DOCUMENTS

| | | | | |
|---|---|---|---|---|
| 5,419,200 A | * | 5/1995 | Burns | G01B 5/30 73/760 |
| 8,645,110 B1 | * | 2/2014 | Weckner | G06F 17/5009 428/36.91 |
| 8,862,437 B1 | | 10/2014 | Rassaian et al. | |
| 2007/0100565 A1 | * | 5/2007 | Gosse | G06F 17/5018 702/34 |
| 2009/0144038 A1 | * | 6/2009 | Rassaian | G01N 3/32 703/6 |
| 2010/0299112 A1 | * | 11/2010 | Goldberg | G06F 17/5018 703/2 |
| 2014/0151507 A1 | | 6/2014 | Woodard et al. | |
| 2014/0288893 A1 | * | 9/2014 | Blom | G06F 17/5018 703/1 |

OTHER PUBLICATIONS

MSC.Software Corporation, Section 5 Failure Criteria for Composites, http://www.myshared.ru/slide/893162/, Slide 4, last visit on Feb. 22, 2017.*
Department of Aerospace Engineering Sciences, University of Colorado at Boulder, Introduction to FEM, Chapter 6, Sep. 2016. http://www.colorado.edu/engineering/CAS/courses.d/IFEM.d/Home.html.*

(Continued)

*Primary Examiner* — Aniss Chad
*Assistant Examiner* — Chuen-Meei Gan

(57) ABSTRACT

A method of predicting the strength characteristics of a composite laminate may include loading a structural model of a composite laminate formed of a material system. The method may additionally include comparing strain invariants from loading the composite laminate to critical strain invariant values of the material system. The method may also include identifying as a first significant event (FSE) a strain invariant of the matrix and/or the fibers reaching a critical strain invariant value.

22 Claims, 13 Drawing Sheets

(56) References Cited

OTHER PUBLICATIONS

Liu et al., Failure Progression and Mesh Sensitivity Analyses by Plate Element-Failure Method, 2010, Journal of Composite Meterials vol. 44, No. 20/2010.*

Tay et al., Damage progression by the element-failure method (EFM) and strain invariant failure theory (SIFT), Dec. 16, 2004, Composites Science and Technology 65 (2005) 935-944.*

Jon H. Gosse et al, Strain invariant failure criteria for polymers in composite material, American Institue of Aeronautics and Astronautics Inc. AIAA-2001-1184.*

Tay et al, Element-Failure: An Alternative to Material Property Degradation Method for Progressive Damage in Composite Structures, Journal of Composite Material vol. 39, No. 18/2005.*

Liu Guangyan, Damage progression in open-hole tension composite laminates by the element-failure method. National University of Singapore, 2007.*

R. Li et al, Application of a First invariant strain criterion for matrix failure in composite materials. Journal of Composite Material vol. 37, No. 22/2003.*

P.F. Liu et al, Recent developments on damage modeling and finite element analysis for composite laminates: A review. Material and Design 31 (2010) 3825-3834.*

Roark, Chapter 6 Stress Concentration. University of Rensselaer Hartford CT. 2013.*

Erik Saether, RESTRAN: Residual Strength Analysis of Impact Damaged Composit Laminates vol. I: Theoretical Manual, Army Research Laboratory, Jul. 2001. p. 1-129.*

David W. Sleight, Progressive Failure Analysis Methodology for Laminated Composite Structures, Mar. 1999, NASA/TP-1999-209107. p. 1-92.*

Pergoraro et al., "Surface and Interfacial Phenomena in Macromolecular Systems," International Union of Pure and Applied Chemistry, Main and special lectures, 17th Discuss ion Conrerence of the Prague Meetings on Macromolecules, held in Prague, Czech Republic, Jul. 2 1-24, 1997.

Beaumont, "Failure processes in composite materials: getting physical ", Journal of Materials Science, Kluwer Academic Publishers, BO, vol. 41, No. 20, Aug. 8, 2006.

Liu, "Recent developments on damage modeling and finite element analysis for composite laminates: A review", Materials and Design, vol. 31. No. 8, Sep. 1, 2010.

Ritchey, "Self-Consistent Micromechanical Enhancement of Continuous Fiber Composites," Advances in Composites Materials—Ecodesign and Analysis, pp. 607-624, ISBN 978-953-307-150-3, Published Mar. 2011.

Tran, "Application of a Scalar Strain-Based Damage Onset Theory to the Failure of a Complex Composite Specimen," 28th Congress of the International Council of the Aeronautical Sciences, Sep. 23-28, 2012, Brisbane, Australia, Paper ICAS 2012-8.9.2

Tran, "Micromechanical Modelling of Test Specimens for Onset of Dilatational Damage of Polymer Matrix in Composite Materials," The 18th International Conference on Composite Materials, Aug. 21, 2011-Aug. 26, 2011, Jeju Island, South Korea.

Feraboli, P., "Strain Invariant Failure Theory (SIFT)," Advanced Materials in Transport Aircraft Structures (AMTAS), AMTAS Autumn 2007 Meeting, Oct. 25, 2007.

McNaught, "Implementation of the Strain Invariant Failure Theory for Failure of Composite Materials," The University of New South Wales, School of Mechanical and Manufacturing Engineering, Oct. 2009.

Gosse, "Strain Invariant Failure Criteria for Polymers in Composite Materials," AIAA-2001-\I84, Apr. 2001.

GCC Patent Office, Examination Report for Application No. GC 2016-30800, dated Jul. 9, 2018.

* cited by examiner

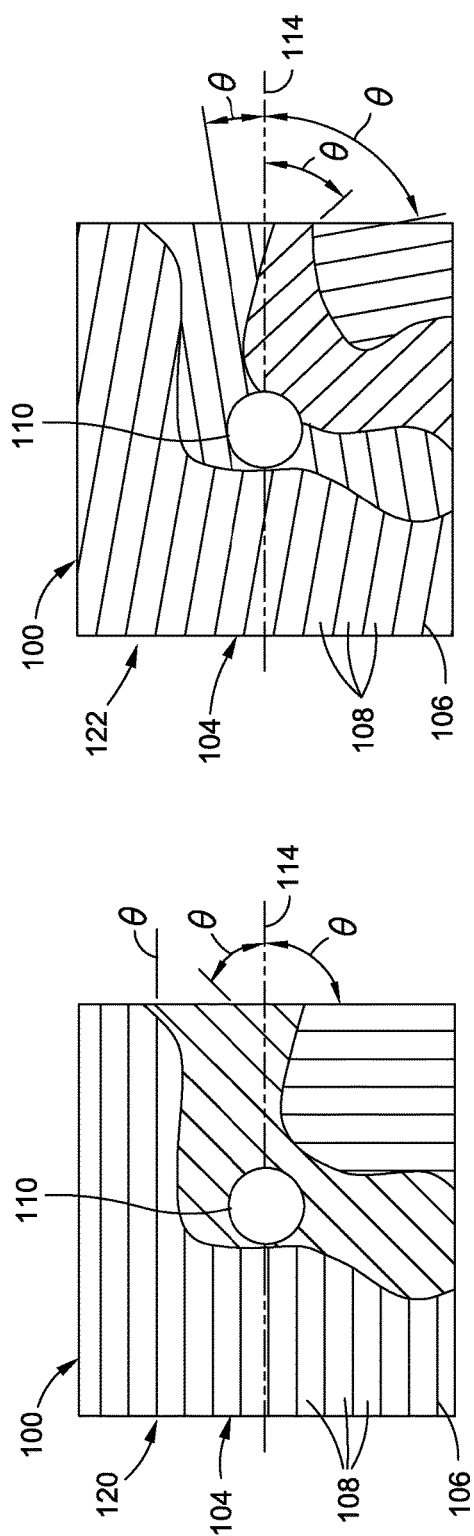
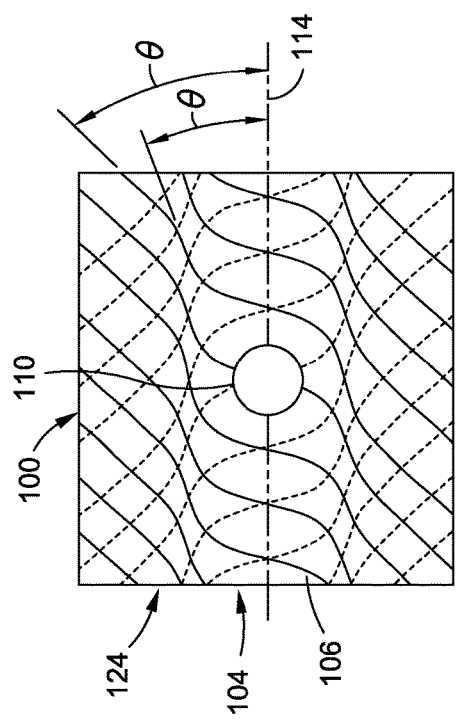

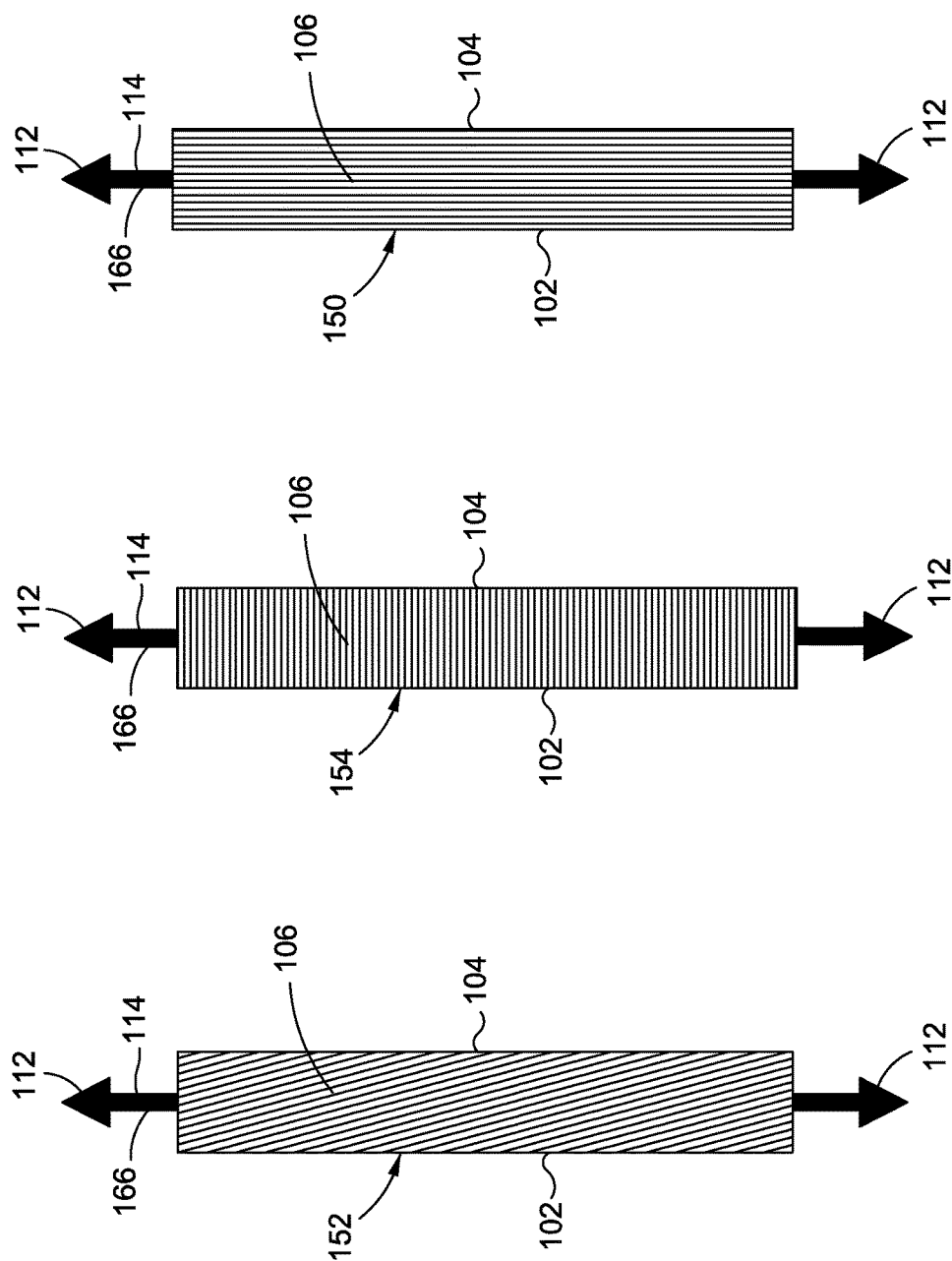

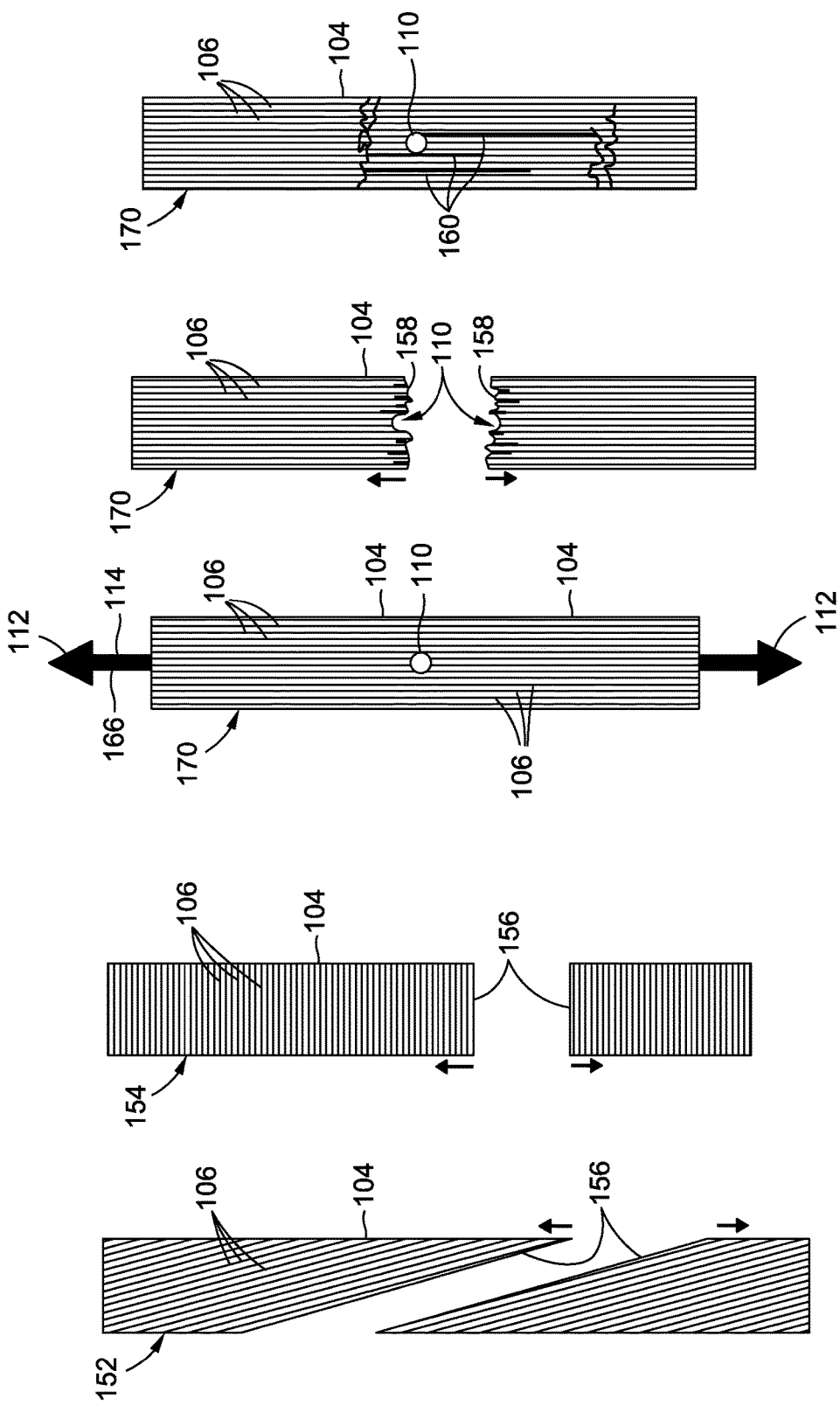

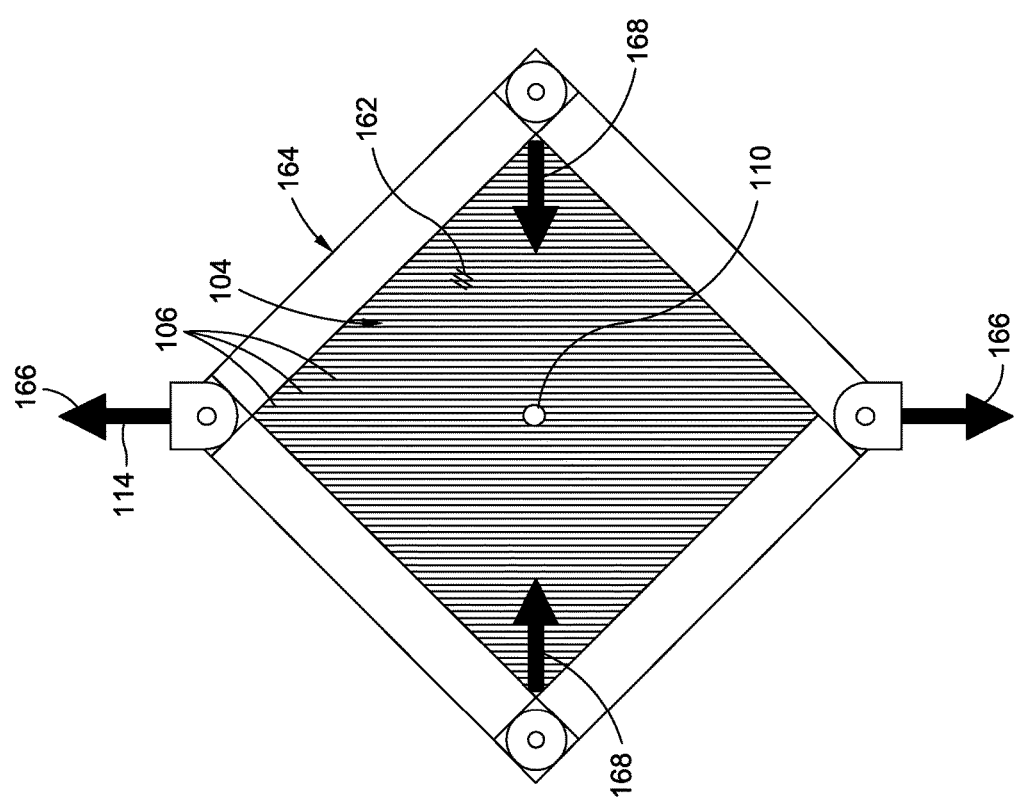

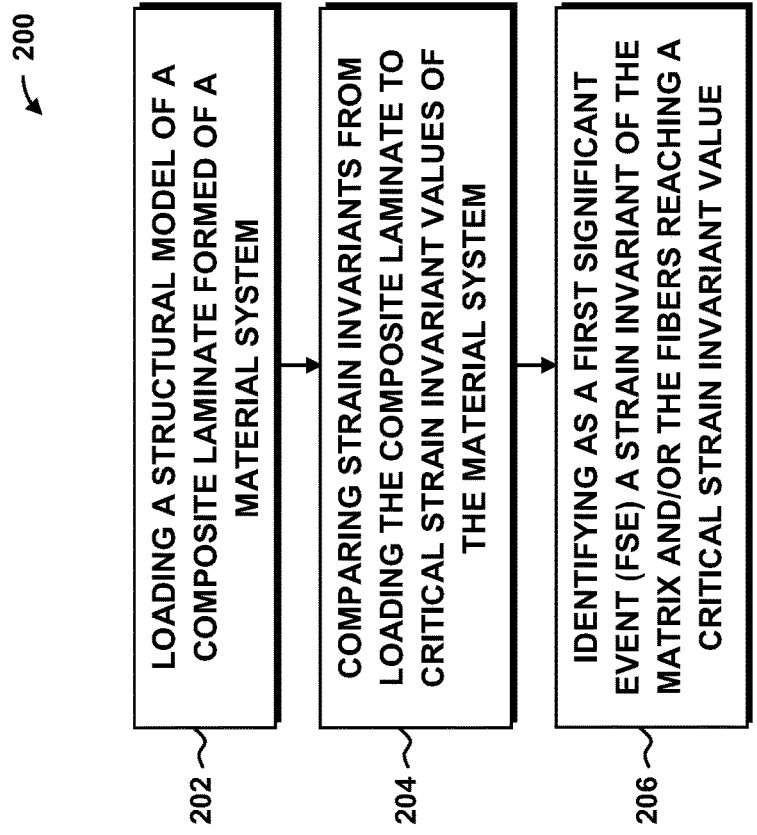

STRENGTH PREDICTION SYSTEM AND METHOD FOR COMPOSITE LAMINATES

FIELD

The present disclosure relates generally to composite structures and, more particularly, to systems and methods for analyzing the strength characteristics of composite laminates.

BACKGROUND

Fiber-reinforced composite structures provide several advantages over metallic structures. For example, composite structures can be configured to provide high specific stiffness and high specific strength relative to metallic structures. Furthermore, composite structures can be tailored to provide a relatively high degree of strength and stiffness along a primary load path. The ability to tailor the strength and stiffness of composites may result in lightweight structures. In addition, composite materials may have improved fatigue resistance relative to metallic materials and may be more resistant to corrosion.

Composite structures may be formed as a laminate of relatively thin layers or plies that are laminated together. Each ply in the composite laminate may include fibers that serve as the primary load-carrying constituent. Composite plies may be formed of unidirectional tape wherein the fibers in each ply are oriented parallel to one another and are held in position by a matrix constituent such as an epoxy resin. The matrix constituent may also redistribute or transfer loads between adjacent fibers. A composite laminate may be configured such that the fibers are oriented to provide the desired strength and stiffness characteristics of the composite structure.

Composite structures may be constructed as traditional laminates, non-traditional laminates, or steered fiber laminates. Traditional composite laminates are composed of plies with constant fiber angles oriented at 0°, ±45°, and 90° relative to the primary load direction of the composite laminate. Non-traditional laminates contain one or more plies with fibers oriented at constant angles other than the traditional 0°, ±45°, and 90° angles. Steered fiber laminates contain one or more plies with fiber angles that continually vary within the plane of each ply. The ability to orient fibers at non-traditional angles and/or vary the fiber angles within the plane of the plies allows for significant improvements in the structural efficiency of a composite laminate. For example, a non-traditional laminate or a steered fiber laminate may be optimized with fiber angles that provide improved strength and/or stiffness characteristics relative to a traditional laminate of the same thickness.

The process of designing a composite laminate may include optimizing the ply layup by iteratively adjusting lamination parameters or adjusting the individual fiber angles and laminate thickness until the process converges on a ply stacking sequence that meets the strength, stiffness, weight, and manufacturing requirements of the composite laminate. The optimization process may require checks on the strength margins of safety of each composite laminate configuration during the optimization process. For certain structures, loading conditions may dictate that a composite laminate has a relatively large quantity of plies. For example, a wing panel of an aircraft may require up to one hundred or more composite plies, each of which requires the determination of the fiber angle. As may be appreciated, the process for optimizing the layup and performing numerous strength checks on a relatively thick composite laminate is preferably performed in a computationally inexpensive manner.

Existing strength check methods have certain drawbacks that detract from their overall utility. For example, one strength check method may rely on a laminate-based allowables database generated from coupon testing. Material allowables are an established limit on material capability in the design of a composite structure, and may be used as a strength margin check. Unfortunately, the use of allowables may result in an overly-conservative and unnecessarily heavy design in certain types of laminates. In addition, a significant amount of coupon testing would be required to characterize the range of possible layups for non-traditional and steered fiber laminates due to the relatively large design space provided by such laminates. Such a coupon testing program may be prohibitively expensive and time-consuming. Additionally, any new fiber-matrix material system would require the determination of material allowables for all forms of laminates.

As can be seen, there exists a need in the art for a system and method for predicting the strength characteristics of composite laminates which is computationally inexpensive and which can be efficiently applied to new fiber-matrix material systems.

SUMMARY

The above-noted needs associated with predicting the strength of composite structures are specifically addressed by the present disclosure which provides a mechanics-based method of predicting the strength characteristics of a composite laminate containing fibers embedded in a matrix. The composite laminate may be a traditional laminate, a non-traditional laminate, or a steered fiber laminate. The strength of a composite laminate may be defined by a sequence of material failures from initiation to damage propagation to ultimate structural or catastrophic failure of the composite laminate. A first significant event (FSE) may be described as the damage state beyond which structural failure of the composite laminate occurs.

The presently-disclosed FSE method determines the strength characteristics of composites required for the design of composite laminates. The method utilizes fundamentals calculated from strain tensors (e.g., strain invariants, concentrations, and components) and features of the composite layup (e.g., ply stacking sequence and ply angles) to identify the FSE. A linear elastic numerical or analytical structural analysis may be performed to provide the necessary strain tensors. The method may include loading a structural model of a composite laminate formed of a material system. The method may additionally include comparing strain invariants from loading the composite laminate to critical strain invariant values of the material system. The method includes identifying as the FSE a strain invariant of the matrix and/or the fibers reaching a critical strain invariant value.

Advantageously, the method provides a means for accurately identifying the location of the FSE within the composite laminate (e.g., identifying a ply) and identifying a value of the strain invariant at the FSE. Furthermore, the method provides a means for differentiating failure modes of the composite laminate with sensitivity to the ply stacking sequence and whether the composite is under uni-axial and multi-axial loading. In addition, the method considers the local strain field around cutout such as holes or notches in a composite laminate, and provides the ability to assess the potential for ply splitting. The FSE method also provides the ability to couple with a non-finite element strain field in analyzing a composite laminate. The method may be applied to any type of composite laminate including traditional laminates, non-traditional laminates, and steered fiber laminates. The FSE method may advantageously be performed with minimal testing and without dependence on laminate test data. In this regard, only three material characterization tests are required to define the critical strain invariant values for the FSE method.

In one example of the method, a finite element model (FEM) of a composite laminate may be loaded until an applied matrix strain reaches either a critical matrix distortion strain or a critical matrix dilatation strain. The example method may additionally include identifying as a first significant event (FSE) the applied matrix strain reaching the critical matrix distortion strain. The FSE may be characterized as a localized deformation leading to a series of cascading failures within the composite laminate. The example method may further include determining whether fibers in the composite laminate can fail when the applied matrix strain reaches the critical matrix dilatation strain. If the fibers cannot fail, the example method may include identifying the FSE as the applied matrix strain reaching the critical matrix dilatation strain.

If the fibers can fail, the example method may include loading the FEM until at least one ply reaches a critical fiber distortion strain and determining whether the fibers in each ply are in tension or compression and whether the fibers can fail. If the composite laminate contains only ply fibers in compression that can fail, the example method may include identifying the FSE as an applied fiber strain reaching the critical fiber distortion strain. If the composite laminate contains ply fibers in compression and tension that can fail, the example method may include calculating the FSE as an amplified strain based upon an appropriate combined strain amplification number. If the composite laminate contains only ply fibers in tension that can fail when the composite laminate is loaded to an equivalent fiber distortion strain, the example method may include calculating as the FSE an amplified strain based upon a strain relief number and a corresponding tension strain amplification number.

Also disclosed is a processor-based system for predicting strength characteristics of a composite laminate. The system may include a structural analyzer configured to load a structural model of a composite laminate formed of a material system. The system may additionally include a strain comparator configured to compare strain invariants from loading the composite laminate to critical strain invariant values of the material system. The system may also include a first significant event (FSE) identifier configured to identify a strain invariant of the matrix and/or the fibers reaching a critical strain invariant value.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a top view of the traditional laminate of FIG. 1 illustrating the quasi-isotropic layup containing 0°, ±45°, and 90° plies;

FIG. 3 is a top view of a non-traditional laminate wherein the plies are not limited to 0°, ±45°, and 90° and wherein the strength characteristics of the non-traditional laminate may also be predicted using the system and methods disclosed herein;

FIG. 4 is a top view of a steered fiber laminate containing plies with curved fiber paths and wherein the strength characteristics of the steered fiber laminate may be predicted using the system and methods disclosed herein;

FIG. 6 is an illustration of an un-notched tension (UNT) coupon containing only plies with fibers oriented at 10° relative to the direction of uniaxial tensile loading for determining the critical matrix distortion strain for the material system from which the composite layer is formed;

FIG. 7 is an illustration of a UNT coupon containing only plies with fibers oriented at 90° relative to the direction of uniaxial tensile loading for determining the critical matrix dilatation strain;

FIG. 8 is an illustration of a UNT coupon containing only plies with fibers oriented at 0° relative to the direction of uniaxial tensile loading for determining the critical fiber distortion strain;

FIG. 9 is an illustration of the 10° coupon after failure and representing damage initiation within the matrix as the first significant event (FSE) for structural failure of the composite laminate;

FIG. 10 is an illustration of the 90° UNT coupon after failure and representing damage initiation within the matrix as the FSE;

FIG. 11 is an illustration of an open hole tension (OHT) coupon formed as a quasi-isotropic layup;

FIG. 12 is an illustration of the structural failure after fiber unloading in a OHT coupon;

FIG. 13 is an illustration of a ply splitting failure mode in an OHT coupon;

FIG. 14 is an illustration of a picture frame shear (PFS) laminate and the simultaneous application of tension load and compression load on the PFS laminate;

FIG. 15 is a flowchart illustrating one or more steps that may be included in a general method of predicting the strength characteristics of a composite laminate;

DETAILED DESCRIPTION

Figure 1:
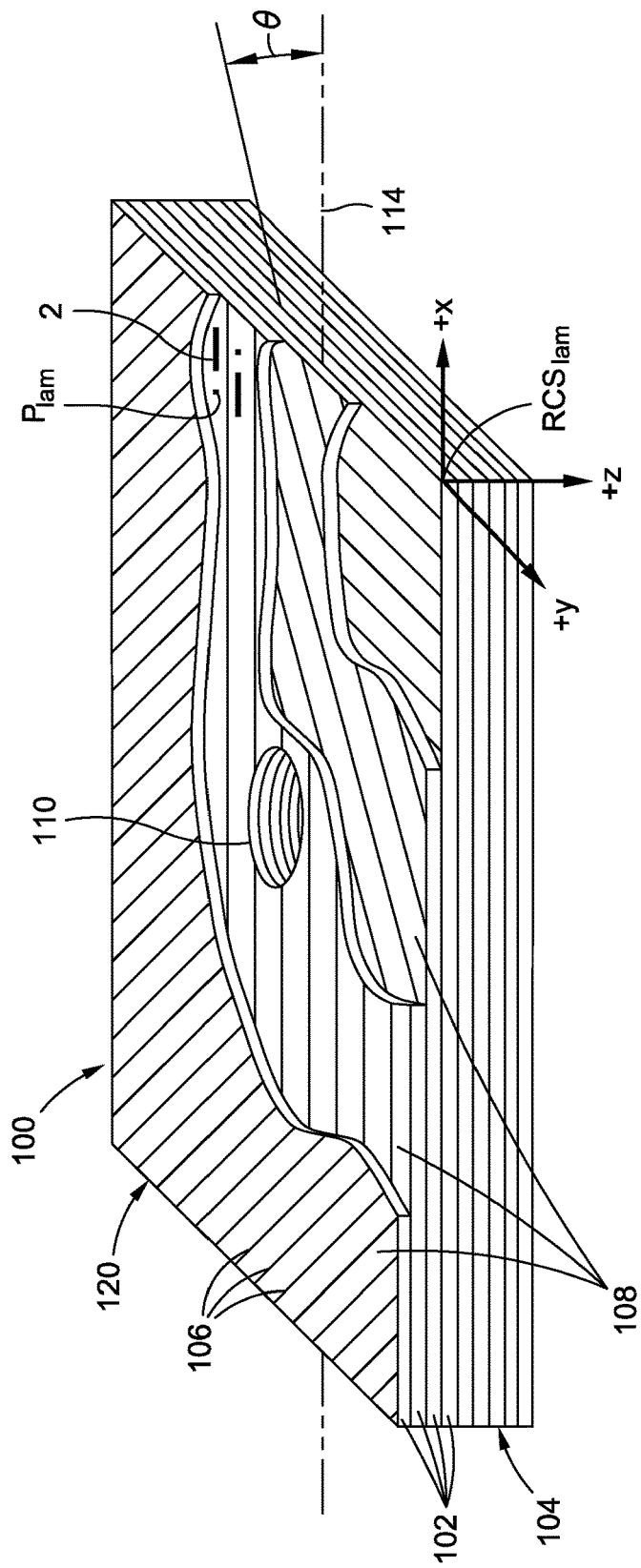
FIG. 1 is a perspective view of a composite laminate having a hole and wherein the strength characteristics of the composite laminate may be predicted using the system and method disclosed herein.

Referring now to the drawings wherein the showings are for purposes of illustrating various embodiments of the disclosure, shown in FIG. 1 is a perspective view of a composite laminate 100 containing reinforcing fibers 106 embedded in a polymer matrix 104. The composite laminate 100 in FIG. 1 is used as an example for illustrating the presently-disclosed system (FIG. 21) and method (FIGS. 17-18) for predicting the strength characteristics of composite laminates. The system and method may be implemented for predicting the strength characteristics of composite laminates of any size, shape, and configuration, without limitation, including traditional laminates 120 (e.g., FIGS. 1-2), non-traditional laminates 122 (e.g., FIG. 3), and steered fiber laminates 124 (e.g., FIG. 4).

As described in greater detail below, the system and method uses composite failure mechanisms to identify a first significant event (FSE) that lead to a cascading series of material failures within the composite laminate 100 and which may lead to structural failure (e.g., catastrophic failure) of the composite laminate 100 due to strain localizations. In the present disclosure, structural failure of the composite laminate may be described as failure that results in the inability of the composite laminate to support loads for which it was originally designed. In this regard, structural failure may not necessarily result in two-piece failure of the composite laminate. Rather, structural failure may include a composite laminate which remains in a single piece, but is unable to support its originally intended design loads.

As described in greater detail below with regard to FIGS. 15-19, the presently-disclosed system and method calculates the strain invariants of the matrix 104 and the fibers 106 from the results of a numerical or analytical structural analysis of a structural model 115 of the composite structure. In one example, the structural analysis may include a finite element analysis (FEA) of a finite element model 116 (FEM) or an in-plane analytical structural model of the composite laminate 100. The presently disclosed method may compare the strain invariants to corresponding critical strain invariant values which may be derived from tensile testing of coupons. In the present disclosure, an FSE may be described as (1) the start of fiber unloading, or (2) damage initiation within the matrix 104 if the fibers 106 cannot fail. The process may also include a laminate splitting or ply splitting failure mode which is discussed below following the description of the FSE process. The disclosed system and method differs from conventional strength prediction approaches wherein failure criteria may be satisfied upon initial local failure of the matrix 104 or an individual fiber 106 which may not necessarily result in fiber unloading or structural failure of the composite laminate.

The present disclosure recognizes that although compressed fibers unload immediately when fiber distortion failure occurs, stretched fibers (e.g., tensioned fibers) within a viscoelastic matrix 104 do not immediately unload when fiber distortion failure occurs. The present disclosure identifies distortional strain within the matrix 104 as the starting point for fiber unloading in stretched fibers such that fiber unloading only occurs when or after local matrix distortion failure occurs. The present disclosure recognizes the existence of strain relief within plies 102 that are highly stretched, and relates strain relief in a ply 102 to load amplification in the deformed environment for stretched fiber unloading, as described in greater detail below.

In FIG. 1, the composite laminate 100 for illustrating the presently disclosed system and method may be made up of a stack of composite plies 102 each including fibers 106 embedded in a thermoplastic or thermosetting matrix 104. In the example shown, the composite laminate 100 may be formed of unidirectional plies 102 containing generally parallel, continuous reinforcing fibers 106. One or more of the composite plies 102 may be made up of a plurality of unidirectional tapes 108, fiber tows, or other fiber forms arranged side-by-side in the composite ply. Each one of the fiber tapes or tows may be made up of a bundle of several thousand continuous reinforcing filaments (not shown). For example, a single fiber tow may include up to 100,000 or more reinforcing filaments. The reinforcing filaments may be formed from materials such as carbon, silicon carbide, boron, ceramic, glass, and/or metallic material. In the present disclosure, the terms fiber 106, composite fiber, reinforcing fiber, and fiber tow may be used interchangeably.

As indicated above, the presently-disclosed system and method may be implemented for predicting the strength characteristics of composite laminates of any size, shape, and configuration, without limitation, and is not limited to the planar, square-shaped, traditional laminate 120 with a centered hole 110 as shown in FIG. 1. A traditional laminate 120 (FIGS. 1-2) may include composite plies 102 oriented at 0°, ±45°, and 90° relative to the load direction 114. The system and method may also be implemented for predicting the strength characteristics of non-traditional laminates 122 (e.g., having plies other than 0°, ±45°, and 90°—see FIG. 3) and steered fiber laminates 124 (FIG. 4), as described above. The presently disclosed system and method may also be implemented for predicting the strength characteristics of composite laminates including one or more plies formed of woven fabric (not shown) or other woven fiber forms. In addition, the system and method may be implemented for predicting the strength characteristics of composite laminates formed of a material system wherein the fibers 106 and matrix 104 of all the composite plies 102 are formed of the same material, or the system and method may be implemented for composite laminates containing plies 102 formed of two or more different fiber-matrix material systems. For example, a composite laminate 100 with two material systems may include high-strength carbon fiber-reinforced epoxy matrix composite plies 102 in the interior of the laminate, and the outermost composite plies 102 may be glass fiber-reinforced composite plies 102 (e.g., fiberglass) for impact resistance.

Figure 5:
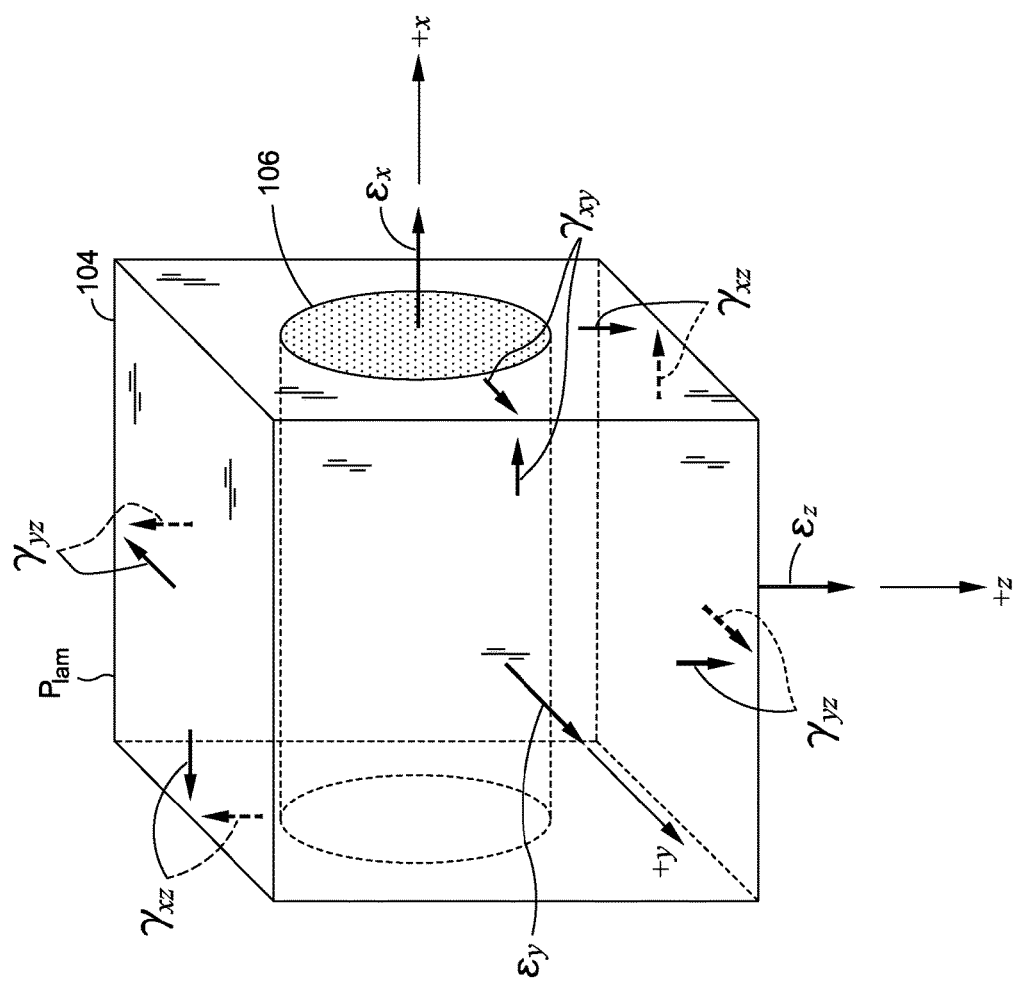
FIG. 5 is a perspective illustration of a representative element of the composite laminate of FIG. 1 and illustrating the notations and orientations of strains relative to a rectangular coordinate system of the composite laminate.

FIG. 5 shows a representative element $P_{lam}$ of the composite laminate 100 of FIG. 1. The representative element $P_{lam}$ includes a representative fiber 106 embedded within matrix 104 material. Also shown are the notations and orientations of the strain components relative to a rectangular coordinate system $RCS_{lam}$ (FIG. 1). The strain components may be used in calculating the dilatational and distortional strain of the matrix 104 phase and the distortional strain of the fiber 106 phase. The strains are described below.

$\varepsilon_x$ is the longitudinal strain along the x direction;
$\varepsilon_y$ is the transverse strain along the y direction;
$\varepsilon_z$ is the transverse strain along the z direction;

$\gamma_{xy}$ is the in-plane shear strain in the x-y plane;
$\gamma_{yz}$ is the out-of-plane shear strain in the y-z plane; and
$\gamma_{xz}$ is the out-of-plane shear strain in the x-z plane.

FIGS. 6-8 illustrate three (3) tensile test coupons 152, 154, 150 that are required for characterizing the critical strain invariant values of a material system of a composite laminate. The three (3) test coupons are each formed of the same material system as the composite laminate 100 and differ from one another only in fiber angle. FIG. 6 shows a 10° UNT (un-notched tension) coupon 152 containing only composite plies 102 with fibers 106 oriented at 10° relative to the direction 114 of uniaxial tensile loading 112 for determining the critical matrix distortion strain ($\varepsilon_{m,dist}^{cr}$) for the material system from which the composite laminate 100 is formed. However, the fibers 106 in the coupon 152 of FIG. 3 may be formed at any arbitrary angle between 0° and 90° (e.g., 45°), with the limitation that none of the fibers 106 in the coupon 152 may extend between the grips (not shown) of the tensile testing machine (not shown) used to apply the tensile load to the coupon 152.

FIG. 7 shows a 90° UNT coupon 154 containing only composite plies 102 with fibers 106 oriented at 90° relative to the direction 114 of uniaxial tensile loading 112 for determining the critical matrix dilatation strain ($\varepsilon_{m,dil}^{cr}$) for the composite laminate 100 material system. FIG. 8 shows a 0° UNT coupon 150 containing only composite plies 102 with fibers 106 oriented at 0° relative to the direction 114 of uniaxial tensile loading 112 for determining the critical fiber distortion strain ($\varepsilon_{f,dist}^{cr}$) for the composite laminate 100 material system. In the case of a composite laminate 100 formed of two (2) or more material systems (not shown), a set of three (3) tensile test coupons would be prepared and tested for each one of the material systems to determine the three (3) critical strain invariant values ($\varepsilon_{m,dist}^{cr}$, $\varepsilon_{m,dil}^{cr}$, and $\varepsilon_{f,dist}^{cr}$) for each material system.

Distortional strain may be characterized as a change in the shape of a material (e.g., strain-induced flow of a matrix), and may be calculated using Equation 100.

$$\varepsilon_{dist} = \sqrt{\frac{1}{6}[(\varepsilon_x - \varepsilon_y)^2 + (\varepsilon_x - \varepsilon_z)^2 + (\varepsilon_y - \varepsilon_z)^2] + \left(\frac{\gamma_{xy}}{2}\right)^2 + \left(\frac{\gamma_{xz}}{2}\right)^2 + \left(\frac{\gamma_{yz}}{2}\right)^2} \quad \text{(Equation 100)}$$

wherein the strain components $\varepsilon_x$, $\varepsilon_y$, $\varepsilon_z$, $\gamma_{xy}$, $\gamma_{yz}$, and $\gamma_{xz}$ are described above and shown in FIG. 5.

Dilatational strain may be characterized as a change in volume of a material (e.g. volumetric expansion), and may be calculated using Equation 110.

$$\varepsilon_{dil} = \varepsilon_x + \varepsilon_y + \varepsilon_z \quad \text{(Equation 110)}$$

In the example composite laminate 100 used in the present disclosure, the three (3) test coupons 152, 154, 150 (FIGS. 6-8) required for material characterization were formed of epoxy prepreg carbon fiber tape. Each coupon was instrumented to obtain strain information (e.g., $\varepsilon_x$, $\varepsilon_y$, $\varepsilon_z$, $\gamma_{xy}$, $\gamma_{yz}$, and $\gamma_{xz}$) and loaded to failure under uniaxial tension to characterize the critical strain invariant values of the epoxy carbon fiber material system. It was demonstrated during testing of the coupons 150, 152, 154 under room temperature ambient conditions that the critical strain invariant values at failure were consistent for laminates under tension and under compression. The critical strain invariant values of the epoxy carbon fiber material are shown in Table 1 below.

TABLE 1

| Strain Invariants | Critical Value | Source |
| --- | --- | --- |
| $\varepsilon_{m,dist}^{cr}$ = Critical Matrix Distortion Strain | 0.115 | [10°] UNT Coupon |
| $\varepsilon_{m,dil}^{cr}$ = Critical Matrix Dilatation Strain | 0.023 | [90°] UNT Coupon |
| $\varepsilon_{f,dist}^{cr}$ = Critical Fiber Distortion Strain | 0.014 | [0°] UNT Coupon |

As described in greater detail below, the first significant event (FSE) in a composite laminate 100 may be established through distortional failure of the fiber 106 phase, dilatational failure of the matrix 104 phase, or distortional failure of the matrix 104 phase. FIG. 9 shows the 10° UNT coupon 152 (shown intact in FIG. 6) after failure and representing matrix damage 156 corresponding to the FSE for catastrophic failure of a composite laminate. FIG. 10 shows the 90° UNT coupon 154 (shown intact in FIG. 8) after failure and also representing matrix damage 156 as the FSE.

FIG. 11 shows an open hole tension (OHT) coupon 170 having a quasi-isotropic layup of 0°, +45°, −45°, and 90° plies relative to the direction 114 of uniaxial tensile load 112 on the OHT coupon 170. FIG. 12 shows the fiber unloading 158 and catastrophic failure of a tensile-loaded OHT coupon containing. The OHT coupon is shown separated into two pieces. As described in greater detail below, the FSE for stretched fibers is matrix distortional failure which occurs after failure of the fibers and which allows the failed fibers to unload. FIG. 13 shows an example of a ply splitting 160 failure mode in an OHT coupon subjected to uniaxial tensile loading. The ply splitting 160 in the coupon is shown as splits in the 0° plies and extending along a direction generally parallel to the load direction 114.

FIG. 14 shows a picture frame shear (PFS) laminate 162 with centered hole 110 and mounted in a PFS test fixture 164 to illustrate the application of combined tension load 166 and compression load 168 on a composite laminate 100. The opposing axial loads at the upper and lower loading corners of the PFS test fixture 164 results in the combination of tension load 166 and compression load 168 on the PFS laminate 162 due to the pivoting ability of the fixture frame members at each corner of the PFS test fixture 164.

FIG. 15 is a flow diagram illustrating a general method for predicting the strength characteristics of a composite laminate including identifying a first significant event (FSE). In FIG. 15, Step 202 of the method 200 may include loading a structural model 115 of a composite laminate. The composite laminate is formed of at least one material system. In addition, the composite laminate may be configured as a traditional laminate, a non-traditional laminate, or a steered fiber laminate, as described above.

Step 204 of the method 200 of FIG. 15 may include comparing strain invariants (e.g., referred to herein as applied strain) from loading the composite laminate to critical strain invariant values of the material system. The strain invariants in the composite laminate may be determined by performing a numerical or analytical structural analysis on the structural model of the composite laminate. In one example, the structural model may be a finite element model 116 (FEM) (e.g., FIG. 16), an in-plane analytical structural model (not shown), or other structural model. The critical strain invariant values may be derived from tensile testing of laminate coupons, as described above. The critical strain invariant values include critical matrix distortion strain ($\varepsilon_{m,dist}^{cr}$), critical matrix dilatation strain ($\varepsilon_{m,dist}^{cr}$), and critical fiber distortion strain ($\varepsilon_{f,dist}^{cr}$).

Step 206 of the method 200 of FIG. 15 may include identifying as a first significant event (FSE) a strain invariant of the matrix and/or the fibers reaching a critical strain invariant value. As indicated above, the FSE may be described as a localized deformation of the composite laminate leading to a cascading series of material failures resulting in structural failure of the composite laminate. The FSE may occur due to local failure of the matrix and/or the fibers at the micro-mechanical level.

The step of identifying the FSE may include identifying the FSE based on whether fibers can fail during loading of the composite laminate and based on a direction of the strain in the fibers of each ply. The identification of the FSE may include identifying the geometric location in the composite laminate of the fiber and/or matrix where the FSE occurs. In addition, identification of the FSE may include identifying the failure state fiber and/or matrix where the FSE occurs and the corresponding strain value.

As described in greater detail below, the step of identifying the FSE may include performing a fiber check to determine whether the failure state is matrix-dominated or fiber-dominated. For example, the method may include determining whether fibers in the composite laminate can fail by determining that the strain along a direction parallel to a fiber is greater that the strain along a direction normal to the fiber. Conversely, it may be determined that the fiber cannot fail if the strain along a direction parallel to the fiber is less that the strain along the direction normal to the fiber.

In some examples, the steps of loading the structural model and identifying the FSE may include loading the structural model, and identifying the FSE as either the matrix reaching the critical matrix distortion strain, or the matrix reaching the critical matrix dilatation strain if it is determined (e.g., by a fiber check) that the fibers in the composite laminate cannot fail. In some examples, the method may include loading the structural model until at least one ply reaches a critical fiber distortion strain, and determining whether the fibers in each ply are in tension or compression and whether the fibers can fail. As described below, if the composite laminate contains only ply fibers in compression that can fail, the method may include identifying the FSE as the applied fiber strain reaching the critical fiber distortion strain. If the composite laminate contains ply fibers in compression and tension that can fail, the method may include calculating the FSE as an amplified strain based upon an appropriate combined strain amplification number. If the composite laminate contains only ply fibers in tension that can fail when loaded to an equivalent fiber distortion strain, the method may include calculating the FSE as an amplified strain based upon a strain relief number and a corresponding tension strain amplification number. The composite laminate may be susceptible to a failure mode of ply splitting when only tension fibers can fail. The amplified strain may represent an approximate strain value at the microscopic level in the fiber or matrix during the FSE.

The step of identifying the FSE may include identifying a geometric location of the FSE within the composite laminate and a value of the strain invariant corresponding to the FSE. The geometric location may be defined as an in-plane location in the composite laminate (e.g. location on a hole edge) and a through-thickness location (e.g., identifying the ply) where the FSE occurs. In some examples, the location of the FSE may be determined by defining a node and the mesh of the finite element module where the FSE occurs. The node may be correlated to a geometric location of the FSE.

FIG. 15 shows an example of a structural model 115 configured as a finite element model 116 (FEM) of the composite laminate 100 of FIG. 1 for finite element analysis (FEA) as an example to illustrate the FSE method shown in FIGS. 17-18 and described below for predicting the strength characteristics of the composite laminate 100. The FEM 116 is comprised of a system of finite elements 118 that are interconnected at nodes to form a mesh. The finite elements 118 in the mesh may be assigned material properties and/or mechanical properties representing one or more material systems from which the composite laminate 100 is formed. One or more loads 112 may be applied to the FEM 116 to simulate the structural response of the composite laminate 100 (FIG. 1) to one or more loading conditions to which the composite laminate 100 may be subjected during service.

Figure 16:
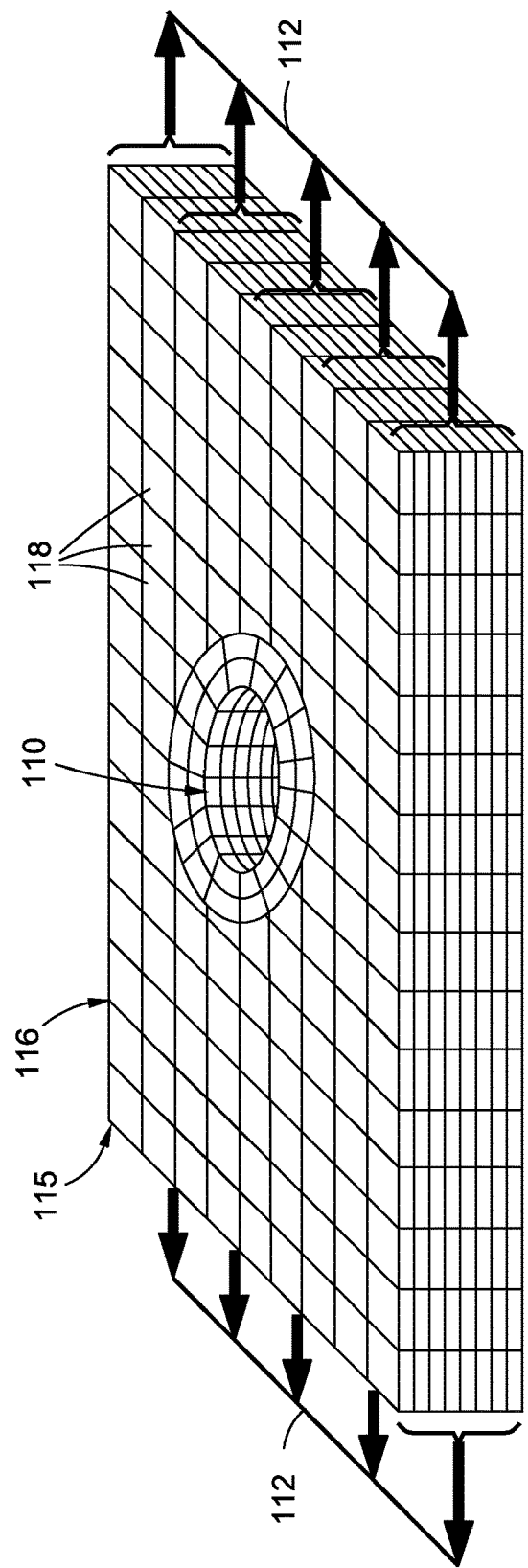
FIG. 16 illustrates a finite element model of the composite laminate shown in FIG. 1.

In the present example, the FEM 116 of FIG. 16 represents the composite laminate 100 of FIG. 1 as a 40/40/20 OHT traditional laminate containing 20 plies with ply stacking sequence of $[45,90,-45,0,0,45,90,-45,0,0]_s$. The plies are formed of the above-described epoxy prepreg carbon fiber tape with nominal ply thickness of 0.0074 inch. The critical strain invariant values of the epoxy carbon fiber tape are shown in Table 1. The FEM includes the 0.25 inch diameter open hole 110 of the composite laminate 100 which has a laminate width to hole diameter (e.g., w/d) ratio of 6. Prior to performing the finite element analysis, the mesh density around a hole 110 must be stable, in the sense that the mesh refinement around a hole should not change the strain value results from the finite element analysis by more than 1%.

During the finite element analysis example of the present disclosure, a distributed uniaxial in-plane tension load 112 is applied to opposite ends of the FEM of FIG. 16. Strain invariants may be calculated from the results of the finite element analysis using shell elements of the FEM. Midplane strain components may be extracted from the finite element analysis results, and may be resolved into components in each fiber direction to calculate the applied strain (e.g., applied matrix strain and applied fiber strain), as described below with regard to the FSE method shown in FIGS. 17-18.

Figure 17:
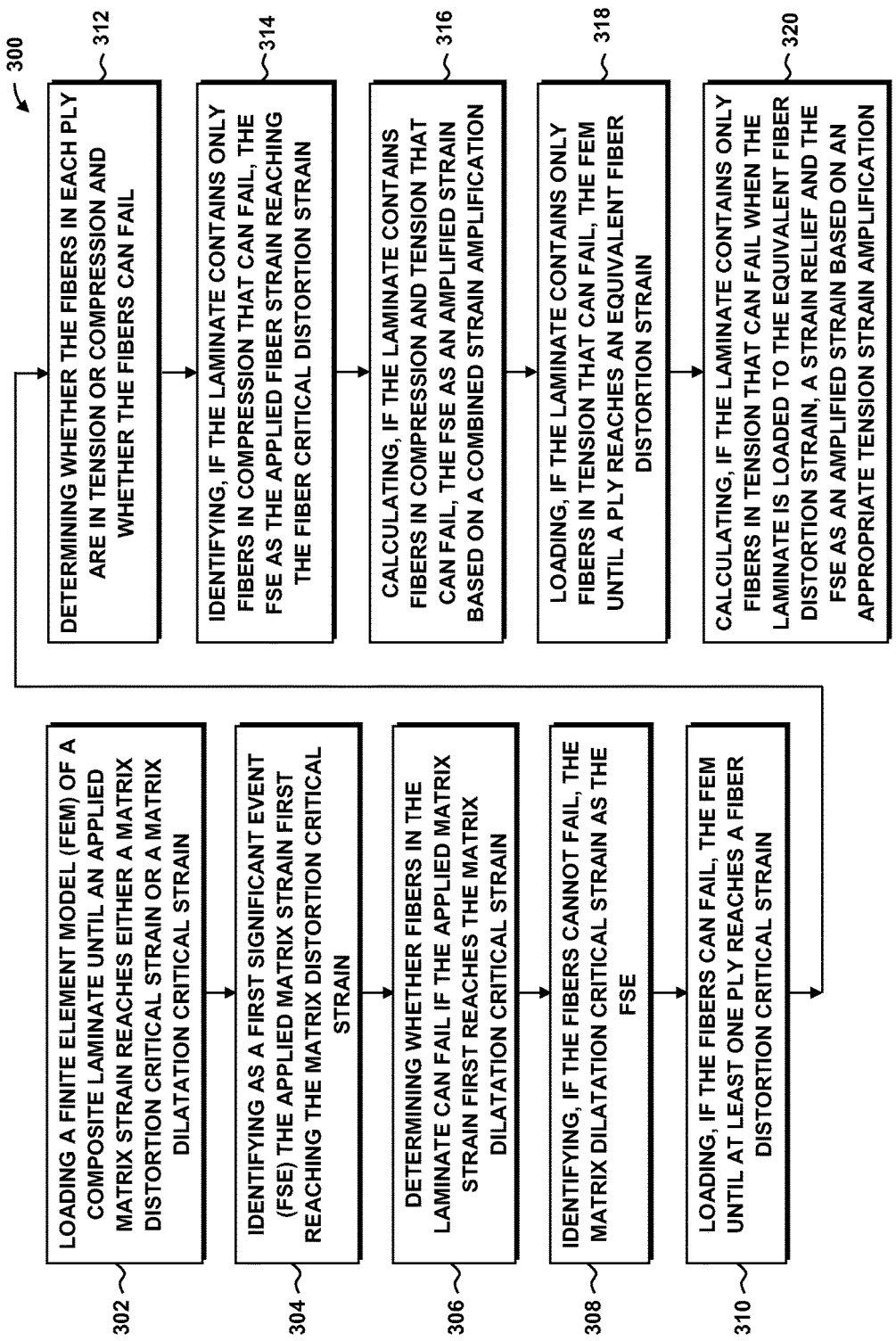
FIG. 17 is a flowchart illustrating one or more operations that may be included in a method of predicting the strength characteristics of a composite laminate including identifying the FSE leading to structural failure of the composite laminate.

FIG. 17 is an example of an implementation of the general strength prediction method 200 described above and illustrated in FIG. 15. In FIG. 17, the flowchart illustrates one or more operations that may be included in an example method 300 of predicting the strength characteristics of a composite laminate, including identifying the FSE leading to structural failure of the composite laminate. FIG. 18 is a process flow diagram 400 corresponding to the method 300 of FIG. 17. The method 300 is described below in the context of the 40/40/20 OHT laminate for which the FEM is shown in FIG. 16.

In the example strength prediction method 300, the first significant event (FSE) leads to structural failure of the composite laminate 100 because the FSE initiates a cascading series of material failures within the composite laminate, as indicated above. The FSE is manifested by interactions of failure states that allow physics-based events to occur in the composite laminate. The method 300 recognizes four failure states and three physics-based events. The four failure states are (1) a compression failure state wherein only compressed fibers can fail, (2) a tension failure state wherein only stretched fibers can fail, (3) a combined failure state wherein both compressed fibers and stretched fibers can fail, or (4) a null failure state wherein none of the fibers 106 in the composite laminate 100 can fail. In the present disclosure, the four failure states do not indicate an ultimate failure mode or an applied load condition. Instead, the four failure states indicate which fibers 106 and/or plies 102 can physically fail under general loading of the composite laminate.

The three physics-based events are (1) fiber failure, (2) matrix failure, and (3) strain relief in a ply containing stretched fibers. Examples of fiber distortional failure include fiber kinking for fibers loaded in compression, and fiber unloading for fibers loaded in tension (e.g., stretched fibers). Examples of matrix failure include the occurrence of transverse cracks and/or delaminations in a composite laminate. An example of strain relief is the strain relief that may occur in an open hole tension [OHT] unidirectional laminate containing highly stretched fibers.

In the compression failure state, the FSE is fiber failure and, more specifically, fiber distortional failure which may manifest as fiber kinking. In fiber distortional failure, the compressed fibers unload when the fibers fail, as indicated above. Although not shown, the application of compressive load to an open hole compression [OHC] coupon is an example of composite laminate 100 subjected to a compression failure state.

In the tension failure state, the FSE is matrix distortional failure. As indicated above, stretched fibers (e.g., tensioned fibers) within a viscoelastic matrix do not immediately unload when fiber distortion failure occurs. Studies using laser Raman spectroscopy have shown breakage of fibers with no drop in strain and indicate that the first opportunity for stretched fibers to unload is upon the occurrence of damage within the matrix due to matrix distortion failure. In general, matrix distortion failure occurs after matrix dilatation failure and stretched fiber failures. As discussed below, matrix distortion failure may lead to fiber unloading and strain relief within a ply. Plies involving strain relief have highly stretched fibers when the matrix fails due to distortion. The application of tension load 112 to an open hole tension (OHT) coupon 170 (e.g., see FIG. 11) is an example of composite laminate 100 subjected to a tension failure state.

In the combined failure state, the tension failure state and the compression failure state exist simultaneously and/or in combination such that stretched fibers and compressed fibers can both fail. The picture frame shear (PFS) laminate 162 shown in FIG. 14 is an example of a composite laminate 100 subjected to the combined failure state. The PFS laminate 162 may be configured as a traditional laminate 120 (FIG. 2), a non-traditional laminate 122 (FIG. 3), or a steered fiber laminate 124 (FIG. 4). As indicated above, the application of opposing loads at the upper and lower loading corners of the PFS test fixture 164 results in a combination of tension load 166 and compression load 168 on the PFS laminate 162 due to the pivoting nature of the fixture frame members at each corner of the PFS test fixture 164.

The null failure state may be determined using the below-described fiber check analysis to confirm whether or not fibers 106 in the composite laminate 100 can fail. In addition, the fiber check analysis can rule out physically impossible failure modes in the composite laminate 100 such as transverse splitting of an individual fiber or torsional failure of an individual fiber. The failure of the 10° UNT coupon 152 in FIG. 9 and the failure of the 90° UNT coupon 154 in FIG. 10 illustrate the null fiber state.

Below is a description of the nomenclature for the strains used in the block diagram of FIG. 18. For purposes of describing the various types of strains and invariants listed in FIG. 18, the representation $\varepsilon_b^a$ is used, wherein epsilon $\varepsilon$ denotes strain and the superscript and subscript b denote the items listed below.

Figure 18:
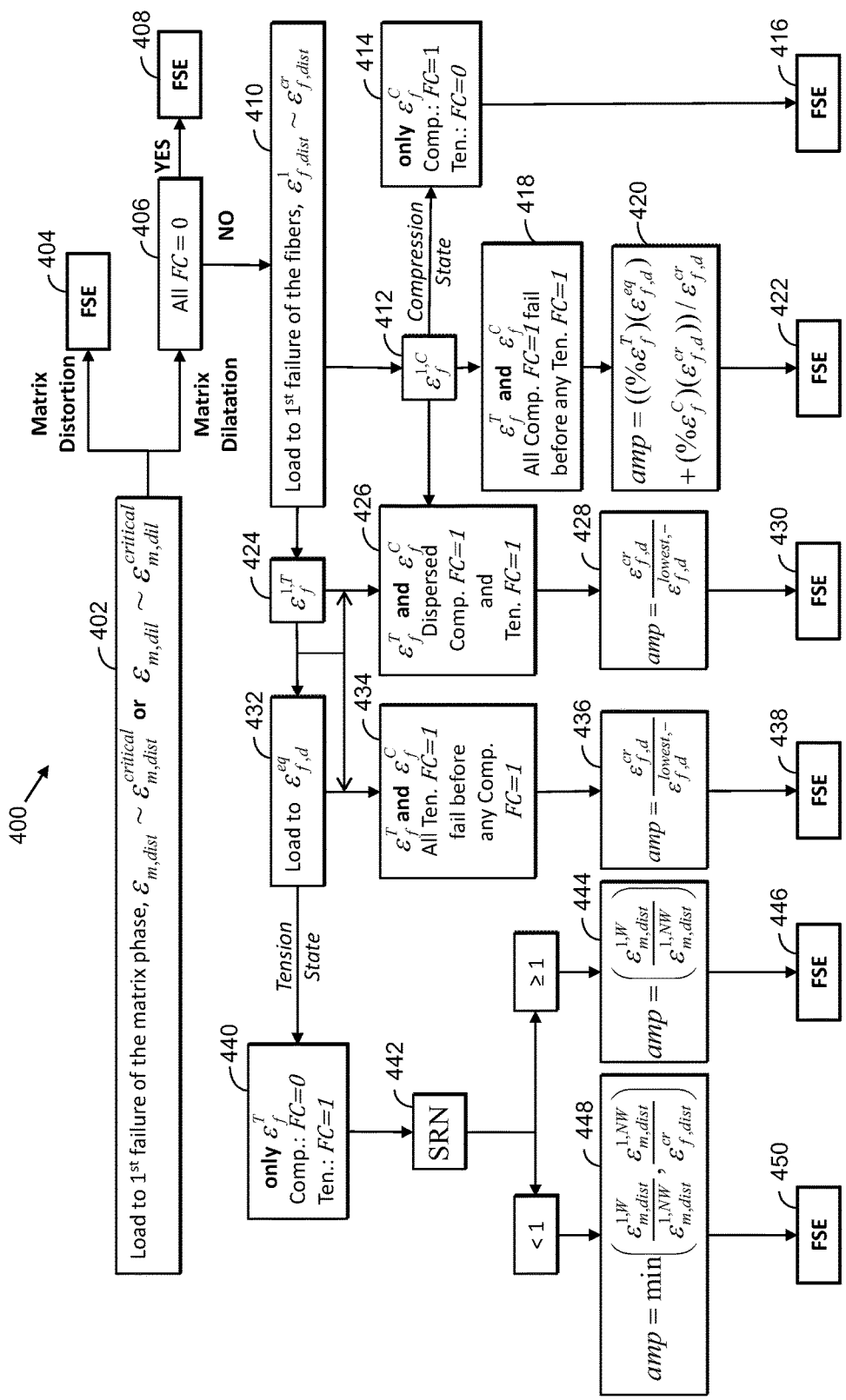
FIG. 18 is a further illustration of the process flow of FIG. 12 containing blocks defining the strain comparisons in the FSE process.

In $\varepsilon_b^a$, the subscript b denotes:
f=fiber
f,dist or f,d=fiber distortion
m=matrix
m,dist=matrix distortion
m,dil=matrix dilatation
In $\varepsilon_b^a$, the superscript a denotes:
cr=critical
1=1$^{st}$ ply
T=tension
C=compression
W=worked ply
NW=non-worked ply
1,NW=first non-worked ply
1, W=first worked ply
1, T=first tensile ply
1, C=first compressive ply
lowest,-=lowest tensile or compressive ply
locate=located ply
Con=Congruent
Lim=Limit
eq=implies equivalent shell value Referring now to FIGS. 17-18, Step 302 of the method 300 of FIG. 17 and corresponding block 402 of FIG. 18 include loading a finite element model 116 (FEM—e.g., see FIG. 16) of a composite laminate 100 until an applied matrix strain $\varepsilon_{m,dist}$ first reaches either a critical matrix distortion strain $\varepsilon_{m,dist}^{cr}$, or a critical matrix dilatation strain $\varepsilon_{m,dil}^{cr}$. For example, the load on the FEM 116 (FIG. 16) may be progressively increased until the applied matrix strain is within a predetermined range (e.g., approximately 1%) of the critical matrix distortion strain or the critical matrix dilatation strain, whichever occurs first.

Step 304 of the method 300 of FIG. 17 and corresponding block 404 of FIG. 18 include defining or identifying the first significant event (FSE) as being the occurrence of the applied matrix strain $\varepsilon_{m,dist}$ reaching the critical matrix distortion strain $\varepsilon_{m,dist}^{cr}$. As indicated above, the first significant event (FSE) may be described as a localized deformation (e.g. a localized fiber failure or a localized matrix failure) leading to a cascading series of material failures such as additional fiber failures and/or additional matrix failure within the composite laminate 100 which may lead to structural failure of the composite laminate. Structural failure of the composite laminate 100 may be described as the inability of the composite laminate 100 to support the load that the laminate is designed to support. In some examples, the method 300 may include identifying the location within the composite laminate 100 where the FSE occurs. For example, a finite element 118 (FIG. 16) may be identified at the location where the FSE occurs. The identity of the finite element 118 may be correlated to a geometric location within the composite laminate. For example, the finite element 118 may correspond to an in-plane location of the composite laminate 100 (e.g., an edge of a hole in the composite laminate) and a through-the-thickness location of the composite laminate 100 (e.g., the location of a ply within the stacking sequence).

For the example of the above-described 40/40/20 OHT laminate containing 20 plies of the epoxy carbon fiber tape with stacking sequence [45,90,−45,0,0,45,90,−45,0,0]$_s$, the FEM 116 (FIG. 16) was loaded until the applied matrix strain $\varepsilon_{m,dist}$ was within 1% of the critical matrix dilatation strain $\varepsilon_{m,dil}^{cr}$ of 0.023. Critical matrix distortion strain $\varepsilon_{m,dist}^{cr}$ was not reached when loading the OHT laminate, such that the FSE for the OHT laminate was not critical matrix distortion strain. In Table 2 below, shown is the applied matrix dilatation strain $\varepsilon_{m,dil}^{cr}$ for each one of the plies of the OHT laminate. The plies are sorted in order of decreasing strain magnitude.

TABLE 2

| Sorted Ply Angles | Applied Matrix Dilatation Strain $\varepsilon_{m,\,dil}{}^{cr}$ | Notes | Fiber Check (FC) FC = 0; fibers cannot fail FC = 1; fibers can fail | Notes |
|---|---|---|---|---|
| 90 | 0.023 | ⎫ | 0 | |
| 90 | 0.023 | ⎪ Within 1% | 0 | |
| 90 | 0.023 | ⎬ of critical | 0 | |
| 90 | 0.023 | ⎪ matrix | 0 | |
| 45 | 0.020 | ⎭ dilatation | 0 | |
| 45 | 0.020 | strain, | 0 | |
| 45 | 0.020 | $\varepsilon_{m,\,dil}{}^{cr}$ | 0 | |
| 45 | 0.020 | | 0 | |
| −45 | 0.020 | | 0 | |
| −45 | 0.020 | | 0 | |
| −45 | 0.020 | | 0 | |
| −45 | 0.020 | | 0 | |
| 0 | 0.014 | | 1 | ⎫ |
| 0 | 0.014 | | 1 | ⎪ |
| 0 | 0.014 | | 1 | ⎬ FC = 1 |
| 0 | 0.014 | | 1 | ⎪ (fibers |
| 0 | 0.014 | | 1 | ⎭ can fail) |
| 0 | 0.014 | | 1 | |
| 0 | 0.014 | | 1 | |
| 0 | 0.014 | | 1 | |

Figure 19:
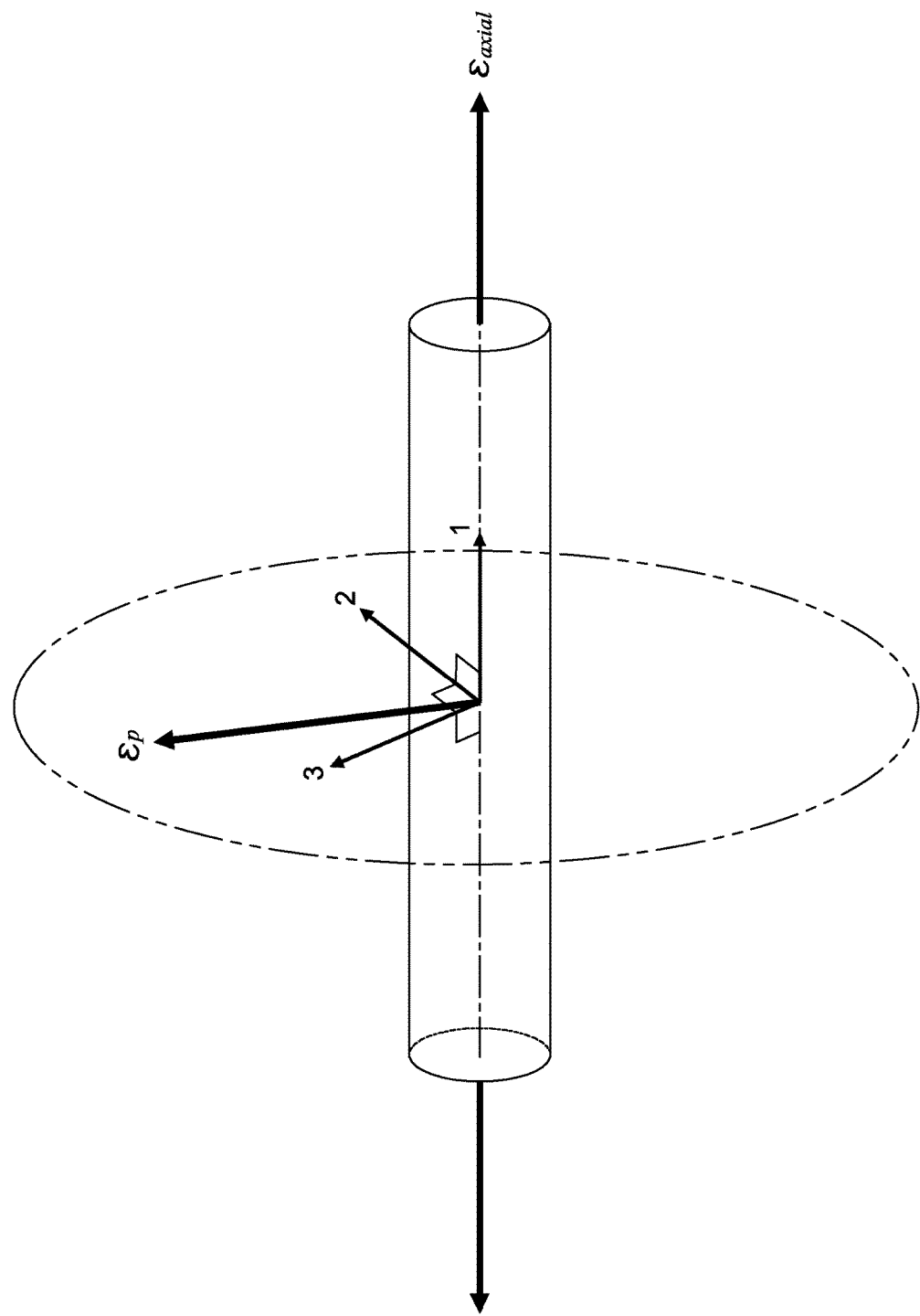
FIG. 19 is a schematic illustration of the fiber axial strain and the fiber principal strain which may be considered in a fiber check step for determining the capability of fibers to fail during the FSE process.

Step 306 of the method 300 of FIG. 17 and corresponding block 406 of FIG. 18 include determining whether one or more fibers 106 in the composite laminate 100 can fail if the applied matrix strain first reaches the critical matrix dilatation strain. A fiber check (FC) is performed, as defined in FIG. 19, to determine whether a fiber 106 can fail. The process of performing a fiber check includes comparing the fiber axial strain $\varepsilon_{axial}$ to the fiber principal strain $\varepsilon_p$. As shown in FIG. 19, the fiber axial strain $\varepsilon_{axial}$ is the strain along the fiber axis 126 (e.g., the 1-axis). The fiber principal strain $\varepsilon_p$ is normal to the fiber axis 126 and is oriented within the 2-3 plane 128 defined by the principal 2-3 axes of the rectangular coordinate system $RCS_{fiber}$ of the fiber 106. The fiber axial strain $\varepsilon_{axial}$ and the fiber principal strain $\varepsilon_p$ are components of the strain on the composite laminate. The fiber principal strain $\varepsilon_p$ may be calculated using Equations 120 and 130 below wherein $\varepsilon_2$ represents transverse strain along axis 2, $\varepsilon_3$ represents transverse strain along axis 3, and $\gamma_{23}$ represents shear strain in the 2-3 plane.

$$\varepsilon_{p(max,min)} = \left(\frac{\varepsilon_2 + \varepsilon_3}{2}\right) \pm \sqrt{\left(\frac{\varepsilon_2 + \varepsilon_3}{2}\right)^2 + \left(\frac{\gamma_{23}}{2}\right)^2} \quad \text{(Equation 120)}$$

$$|\varepsilon_p| \geq \max(|\varepsilon_{p,max}|, |\varepsilon_{p,min}|) \quad \text{(Equation 130)}$$

In the present disclosure, a fiber can fail ("FC=1" in FIG. 18) if the fiber axial strain $\varepsilon_{axial}$ is greater that the fiber strain $\varepsilon_p$, as indicated by the following expression: If $|\varepsilon_{axial}|>|\varepsilon_p|$, then FC=1, else FC=0. In Step 308 of the method 300 of FIG. 17 and corresponding block 408 of FIG. 18, if one or more fibers cannot fail ("All FC=0" in FIG. 18), then this is the above-described null failure state, and the loading at which the applied matrix strain reaches the critical matrix dilatation strain is the FSE. In this regard, Step 308 includes identifying the FSE as the applied matrix strain reaching the critical matrix dilatation strain, after which the strength prediction method 300 stops. If at least one fiber can fail ("FC=1" in FIG. 18), then the strength prediction method 300 continues to Step 310 of FIG. 13. In Table 2 above for the example of the epoxy carbon fiber OHT laminate, the results of the fiber check are shown for each ply in the composite laminate. The 0° plies all have fibers that can fail. Therefore, the strength prediction method 300 continues.

Step 310 of the method 300 of FIG. 17 and corresponding block 410 of FIG. 18 may include loading, if at least one fiber 106 in the composite laminate 100 can fail, the FEM until at least one ply in the composite laminate 100 reaches a critical fiber distortion strain $\varepsilon_{f,dist}{}^{cr}$. Table 3 below shows the results of loading the epoxy carbon fiber OHT laminate until the applied fiber distortion strain $\varepsilon_{m,dist}$ in a first ply was within 1% of the critical fiber distortion strain $\varepsilon_{f,dist}{}^{cr}$ dist of 0.014. The plies in Table 3 are sorted in order of decreasing strain magnitude. Also shown in Table 3 are the results of a fiber check that was performed on each ply following the loading of the composite laminate 100 to the critical fiber distortion strain $\varepsilon_{f,dist}{}^{cr}$. In addition, shown is the fiber direction strain magnitude and direction (i.e., positive value denotes the tension direction; negative value denotes the compression direction) in each ply.

TABLE 3

| Sorted Ply Angles | Fiber Check (FC) | Applied Fiber Distortion Strain $\varepsilon_{m,\,dist}$ | Notes | Fiber Direction Strain | Notes |
|---|---|---|---|---|---|
| 0 | 1 | 0.014 | ⎫ | 0.018 | ⎫ |
| 0 | 1 | 0.014 | ⎪ Within 1% | 0.018 | ⎪ First plies to |
| 0 | 1 | 0.014 | ⎬ of critical | 0.018 | ⎬ fail; |
| 0 | 1 | 0.014 | ⎪ fiber | 0.018 | ⎪ Plies are in |
| 0 | 1 | 0.014 | ⎪ distortion | 0.018 | ⎪ tension; |
| 0 | 1 | 0.014 | ⎪ strain, | 0.018 | ⎪ FC = 1 (fibers |
| 0 | 1 | 0.014 | ⎭ $\varepsilon_{f,\,dist}{}^{cr}$ | 0.018 | ⎭ can fail) |

TABLE 3-continued

| Sorted Ply Angles | Fiber Check (FC) | Applied Fiber Distortion Strain $\varepsilon_{m,\,dist}$ | Notes | Fiber Direction Strain | Notes |
|---|---|---|---|---|---|
| 0 | 1 | 0.014 | | 0.018 | |
| 90 | 0 | 0.013 | | −0.006 | |
| 90 | 0 | 0.013 | | −0.006 | |
| 90 | 0 | 0.013 | | −0.006 | |
| 90 | 0 | 0.013 | | −0.006 | |
| −45 | 1 | 0.011 | | 0.014 | |
| −45 | 1 | 0.011 | | 0.014 | |
| −45 | 1 | 0.011 | | 0.014 | Plies are in tension; FC = 1 (fibers can fail) |
| −45 | 1 | 0.011 | | 0.014 | |
| 45 | 1 | 0.011 | | 0.014 | |
| 45 | 1 | 0.011 | | 0.014 | |
| 45 | 1 | 0.011 | | 0.014 | |
| 45 | 1 | 0.011 | | 0.014 | |

Step 312 of the method 300 of FIG. 17 and corresponding block 404 of FIG. 18 may include determining whether the fibers 106 in each ply are in tension or compression and whether the fibers 106 can fail. As indicated above in Table 3 for the OHT laminate example, the FEM was loaded until the 0° plies reached the critical fiber distortion strain $\varepsilon_{f,dist}^{cr}$ of 0.014. The corresponding strain along each fiber direction was then determined for each ply when loaded to the critical fiber distortion strain $\varepsilon_{f,dist}^{cr}$. Table 3 shows that the fiber direction strain in the 0° plies is the highest of all the plies, and therefore the fibers in the 0° plies would fail first. Furthermore, Table 3 indicates that the fiber direction strain is positive for the 0° plies (0.018) and positive for the 45° plies (0.014), indicating that the fibers in the 0° and 45° plies are in tension. The fiber direction strain in the 90° plies is negative (−0.006) indicating that the fibers in the 90° plies are in compression. The above-described fiber check (FC) was performed for all plies when loaded to the critical fiber distortion strain $\varepsilon_{f,dist}^{cr}$. The results of the fiber check indicate that the 0° and 45° plies can fail, and the 90° plies cannot fail. Therefore, the strength prediction method 300 for the OHT laminate example would normally proceed to block 424 of FIG. 18. However, the method 300 and corresponding blocks 412-422 are described immediately below.

Referring to Step 314 of FIG. 17 and block 414 of FIG. 18, if the composite laminate 100 contains only ply fibers in compression that can fail (FC=1) and no fibers in tension that can fail (FC=0), then the compression failure state is present, and Step 314 may include identifying the FSE as the occurrence of the applied fiber strain reaching the critical fiber distortion strain, as shown in block 416 of FIG. 18. In the compression failure state, the fiber distortional failure may manifest as fiber kinking, as indicated above. If the composite laminate 100 is not limited to only ply fibers in compression that can fail, then the strength prediction method 300 continues.

Referring to Step 316 of the method 300 of FIG. 17, if the composite laminate 100 contains ply fibers in both compression and tension that can fail, then the combined failure state is present. The method for the combined failure state may include calculating an appropriate combined state strain amplification from which an amplified strain is calculated as the FSE. The combined state strain amplification may be used to amplify the fiber distortion strain $\varepsilon_{f,dist}$ such that the amplified strain represents the strain at the microscopic level.

For the combined failure state, there are three combined failure sub-states that have different strain amplification factors. The three combined failure sub-states include: (1) the fibers in compression fail before any fibers in tension fail, (2) the fibers in compression and tension fail at approximately the same time, and (3) the fibers in tension fail before any fibers in compression fail. The strain amplification for the combined failure sub-state where the compression fibers fail before any tension fibers fail is different than the strain amplification for the combined failure sub-state where the tension and compression fibers fail simultaneously, and for the combined failure sub-state where the tension fibers fail before any compression fibers fail.

The first combined failure sub-state is where the fibers in compression fail before any fibers in tension fail, and is shown in block 418 of FIG. 18. The combined strain amplification factor for such failure sub-state is calculated using the equation shown in block 420 and which is reproduced below as Equation 140. The FSE in block 422 may be expressed as an amplified strain which may be calculated as a product of the combined state strain amplification (e.g., amp) and the fiber distortion strain $\varepsilon_{f,dist}$ shown in block 410.

$$amp = ((\%\ \varepsilon_f^T)(\varepsilon_{f,d}^{eq}) + (\%\ \varepsilon_f^C)(\varepsilon_{f,d}^{cr}))/\varepsilon_{f,d}^{cr} \quad \text{(Equation 140)}$$

In Equation 140, % $\varepsilon_f^T$ is the percentage of fibers in the composite laminate 100 that are in tension, % $\varepsilon_f^C$ is the percentage of fibers that are in compression, $\varepsilon_{f,d}^{cr}$ is the critical fiber distortion strain described above, and $\varepsilon_{f,d}^{eq}$ is the equivalent fiber distortion strain. The equivalent fiber distortion strain $\varepsilon_{f,d}^{eq}$ is the value of the fiber distortion strain when the matrix becomes critical due to distortion. For the epoxy carbon fiber tape material used in the OHT laminate example of the present disclosure, the equivalent fiber distortion strain $\varepsilon_{f,d}^{eq}$ is 0.0193 when the matrix reaches the critical matrix distortion strain $\varepsilon_{m,dist}^{cr}$ value of 0.115. The equivalent fiber distortion strain $\varepsilon_{f,d}^{eq}$ is determined from the equivalent shell strain in a shell element of the FEM.

The second combined failure sub-state is where at least some of the fibers in compression $\varepsilon_f^{1,C}$ and tension $\varepsilon_f^{1,T}$ fail at approximately the same time, and is shown in block 426 of FIG. 18 (e.g., "Dispersed; Comp. FC=1 and Ten. FC=1"). The combined strain amplification factor for such failure sub-state is calculated using the equation shown in block 428 and which is reproduced below as Equation 150.

$$amp = \frac{\varepsilon_{f,d}^{cr}}{\varepsilon_{f,d}^{lowest,-}} \quad \text{(Equation 150)}$$

In Equation 150, $\varepsilon_{f,d}^{cr}$ is the critical fiber distortion strain as described above, and $\varepsilon_{f,d}^{lowest,-}$ is the lowest value of the critical fiber distortion strain of the tension and compression fibers. The FSE in block 430 may be expressed as an amplified strain which may be calculated as a product of the combined state strain amplification (e.g., amp) and the fiber distortion strain $\varepsilon_{f,dist}$ shown in block 410.

The third combined failure sub-state is where the fibers in tension fail before any fibers in compression fail, and is shown in block 434 of FIG. 18. The combined strain amplification factor for such failure sub-state is calculated using the equation shown in block 436 and is described above as Equation 150. The FSE in block 438 may be expressed as an amplified strain which may be calculated as a product of the combined state strain amplification (e.g., amp) and the fiber distortion strain $\varepsilon_{f,dist}$ shown in block 432. If the composite laminate 100 contains only fibers in tension that can fail when the composite laminate 100 is loaded to the critical fiber distortion strain $\varepsilon_{f,dist}^{cr}$, then the strength prediction method 300 proceeds to Step 318.

In the tension failure state, the composite laminate 100 contains only ply fibers in tension that can fail and no fibers in compression can fail. As indicated above, for the tension failure state, the FEM must be loaded to the equivalent fiber distortion strain $\varepsilon_{f,d}^{eq}$ based on the recognition that stretched fibers (e.g., tensioned fibers) within a matrix do not immediately unload when fiber distortion failure occurs and, instead, such stretched fibers unload when local matrix distortion failure occurs, which is implied at the equivalent fiber distortion strain $\varepsilon_{f,d}^{eq}$. Loading is applied to the composite laminate 100 to identify the first critical matrix distortion, and which is implicitly performed by checking the fiber distortion value. The matrix distortion invariant from shell elements may be unreliable. Therefore, a displacement is applied to a three-dimensional (3d) model of the composite laminate 100 until the critical matrix distortion value is reached. The displacements from such load state are then applied to the equivalent shell model. The equivalent fiber distortion strain $\varepsilon_{f,d}^{eq}$ is then used to imply the critical matrix distortion value. The above-noted procedure is performed once for each material system in a composite laminate. As indicated above, for the epoxy carbon fiber tape used in the OHT laminate example of the present disclosure, the equivalent fiber distortion strain $\varepsilon_{f,d}^{eq}$ is 0.0193 when the matrix 104 reaches the critical matrix distortion strain $\varepsilon_{m,dist}^{cr}$ of 0.115.

For the tension failure state, Step 318 of the method 300 of FIG. 17 and corresponding block 432 of FIG. 18 may include loading (e.g., progressively increasing the load) on the FEM until a ply reaches the above-noted equivalent fiber distortion strain $\varepsilon_{f,d}^{eq}$, as shown in block 440 of FIG. 18. Table 4 below shows the results of loading the epoxy carbon fiber OHT laminate until the applied fiber distortion strain $\varepsilon_{m,dist}$ in the first ply was within 1% of the equivalent fiber distortion strain $\varepsilon_{f,d}^{eq}$ of 0.0193. The plies in Table 4 are sorted in order of decreasing strain magnitude. Also shown in Table 4 are the results of a fiber check that was performed on each ply following the loading of the composite laminate 100 to the equivalent fiber distortion strain $\varepsilon_{f,d}^{eq}$.

TABLE 4

| Sorted Ply Angles | Applied Fiber Distortion Strain $\varepsilon_{m,\ dist}$ | Notes | Fiber Check (FC) | Notes |
|---|---|---|---|---|
| 0 | 0.019 | | 1 | |
| 0 | 0.019 | Within 1% | 1 | |
| 0 | 0.019 | of | 1 | Plies are in |
| 0 | 0.019 | equivalent | 1 | tension; |
| 0 | 0.019 | fiber | 1 | FC = 1 (fibers |
| 0 | 0.019 | distortion | 1 | can fail) |
| 0 | 0.019 | strain, $\varepsilon_{f,d}^{eq}$ | 1 | |
| 0 | 0.019 | | 1 | |
| 90 | 0.018 | | 0 | |
| 90 | 0.018 | | 0 | |
| 90 | 0.018 | | 0 | |
| 90 | 0.018 | | 0 | |
| −45 | 0.015 | | 1 | |
| −45 | 0.015 | | 1 | |
| −45 | 0.015 | | 1 | Plies are in |
| −45 | 0.015 | | 1 | tension; |
| 45 | 0.015 | | 1 | FC = 1 (fibers |
| 45 | 0.015 | | 1 | can fail) |
| 45 | 0.015 | | 1 | |
| 45 | 0.015 | | 1 | |

Step 320 of the method 300 of FIG. 17 and corresponding block 442 of FIG. 18 may include calculating a strain relief number. If the composite laminate 100 contains only ply fibers in tension that can fail when the composite laminate 100 is loaded to the equivalent fiber distortion strain, the strain relief number may be calculated to indicate whether strain relief is present in a composite laminate 100 loaded to the equivalent fiber distortion strain $\varepsilon_{f,d}^{eq}$. The present disclosure recognizes that matrix distortional failure may not necessarily lead to fiber unloading due to the fact that strain relief may be occurring in stretched plies of the composite laminate. In the present disclosure, plies that involve strain relief are described as worked plies. Plies that do not involve strain relief are described as non-worked plies. A threshold parameter for determining whether a ply is worked or non-worked is the average tensile failure strain $\overline{\varepsilon^{UNT}}_f$ of a 0° UNT coupon 150 (e.g., see FIG. 8) for the material system of the composite laminate. The relationship is represented by the following: If $\varepsilon_f^{tensile} \geq \overline{\varepsilon^{UNT}}_f$, then $\varepsilon_f^{tensile} = \varepsilon_f^{WP}$ (worked ply).

For the epoxy carbon fiber tape material used in the OHT laminate example of the present disclosure, the average tensile failure strain $\overline{\varepsilon^{UNT}}_f$ was 0.018. Table 5 below shows the maximum fiber tensile strain for the epoxy carbon fiber OHT laminate.

TABLE 5

| Sorted Ply Angles | Maximum Fiber Tensile Strain | Notes |
|---|---|---|
| 0 | 0.025 | |
| 0 | 0.025 | |
| 0 | 0.025 | Greater than worked fiber strain threshhold, (0.018) |
| 0 | 0.025 | |
| 0 | 0.025 | |
| 0 | 0.025 | |
| 0 | 0.025 | |
| 0 | 0.025 | |
| 90 | 0.003 | |
| 90 | 0.003 | |
| 90 | 0.003 | |
| 90 | 0.003 | |
| −45 | 0.019 | |
| −45 | 0.019 | |
| −45 | 0.019 | Greater than worked fiber strain threshhold, (0.018) |
| −45 | 0.019 | |
| 45 | 0.019 | |
| 45 | 0.019 | |
| 45 | 0.019 | |
| 45 | 0.019 | |

TABLE 6

| Sorted Ply Angles | Applied Fiber Distortion Strain $\varepsilon_{m,dist}$ | Notes |
|---|---|---|
| 0 | 0.019 | ← $\varepsilon_{f,dist}^{1,W}$ |
| 0 | 0.019 | |
| 0 | 0.019 | |
| 0 | 0.019 | |
| 0 | 0.019 | |
| 0 | 0.019 | |
| 0 | 0.019 | |
| 0 | 0.019 | |
| 90 | 0.018 | |
| 90 | 0.018 | |
| 90 | 0.018 | |
| 90 | 0.018 | |
| −45 | 0.015 | |
| −45 | 0.015 | |
| −45 | 0.015 | |
| −45 | 0.015 | |
| 45 | 0.015 | |
| 45 | 0.015 | |
| 45 | 0.015 | |
| 45 | 0.015 | ← $\varepsilon_{f,dist}^{L,W}$ |

Percentages of worked plies and non-worked plies may be used to calculate the strain relief number as an indicator that strain relief may be present. The strain relief number (SRN) may be calculated using Equation 160 below.

$$SRN = \frac{(\sum \varepsilon_f^{max,W})(\% \, np^W)}{(\sum \varepsilon_f^{max,NW})(\% \, np^{NW})} \qquad \text{(Equation 160)}$$

In Equation 160, $\varepsilon_f^{max,W}$ is the sum of the maximum fiber strain in each worked ply, $\varepsilon_f^{max,NW}$ is the sum of the maximum fiber strain in each worked ply, $\% \, np^W$ is the percentage of worked plies, and $\% \, np^{NW}$ is the percentage of worked plies. For the epoxy carbon fiber tape material used in the OHT laminate example of the present disclosure, the calculation of the SRN in Equation 170 as follows:

$$SRN = \frac{(0.3541)(0.8)}{(0.0107)(0.2)} = 132.4 \qquad \text{(Equation 170)}$$

The calculated SRN is 132.4 which is greater than or equal to the threshold 1. Therefore, following block 444 of FIG. 18 and Step 320 of FIG. 17, an amplified strain may be calculated based on the tension strain amplification number (amp). The tension strain amplification number may be represented by the following: amp=increase $\varepsilon_{f,dist}^{1,NW}$ to $\varepsilon_{f,d}^{eq}$ (the equivalent fiber distortion strain). The tension strain amplification number (amp) may be calculated according to the Equation 180 below.

$$amp = \left(\frac{\varepsilon_{m,dist}^{1,W}}{\varepsilon_{m,dist}^{1,NW}}\right) \qquad \text{(Equation 180)}$$

In Equation 180, $\varepsilon_{f,dist}^{1,W}$ is the critical equivalent fiber distortion strain for the first worked ply, and $\varepsilon_{f,dist}^{1,NW}$ is the equivalent fiber distortion strain for the first non-worked ply after all of the worked plies. In the event that the last ply is worked $\varepsilon_{f,dis}^{L,W}$, then the strain value of this last ply is used in the denominator of Equation 180.

For the epoxy carbon fiber tape material used in the OHT laminate example of the present disclosure, the tension strain amplification number (amp) is calculated in Equation 190 as follows:

$$amp = \left(\frac{\varepsilon_{f,dist}^{1,W}}{\varepsilon_{f,dist}^{L,NW}}\right) = \frac{0.019}{0.015} = 1.267 \qquad \text{(Equation 190)}$$

Step 320 of FIG. 17 and corresponding block 446 of FIG. 18 may further include calculating an amplified strain or stress as the FSE. The amplified stress may be calculated according to Equation 200 below.

$$\sigma_{ff}^{FSE} = amp * \sigma_{ff}^{eq} \qquad \text{(Equation 200)}$$

In Equation 200, $\sigma_{ff}^{eq}$ is the far-field stress in the first ply when the first ply is at the equivalent fiber distortion strain $\varepsilon_{f,dist}^{1,W}$. For the epoxy carbon fiber tape OHT laminate of the present disclosure, the far-field stress $\sigma_{ff}^{eq}$ is 83.23 ksi when the equivalent fiber distortion strain $\varepsilon_{f,dist}^{1,W}$ in the first ply is 0.019. The amplified stress may be determined according to Equation 210 below.

$$\sigma_{ff}^{FSE} = (1.267)(83.23 ksi) = 104.2 ksi \qquad \text{(Equation 210)}$$

Any one of the above-noted FSEs may be calculated as amplified stress in the same manner as in Equation 210.

For the case where the strain relief number (SRN) is less than the threshold 1, block 448 of FIG. 18 may include determining the tension strain amplification number (amp) according to the Equation 220 below.

$$amp = \min\left(\frac{\varepsilon_{m,dist}^{1,W}}{\varepsilon_{m,dist}^{1,NW}}, \frac{\varepsilon_{m,dist}^{1,NW}}{\varepsilon_{f,dist}^{cr}}\right) \qquad \text{(Equation 220)}$$

In Equation 220, $\varepsilon_{f,dist}^{1,W}$ is the critical equivalent fiber distortion strain for the first worked ply, $\varepsilon_{f,dist}^{1,NW}$ is the equivalent fiber distortion strain for the first non-worked ply after all of the worked plies 102, and $\varepsilon_{f,dist}^{cr}$ is the critical fiber distortion strain.

Figure 20:
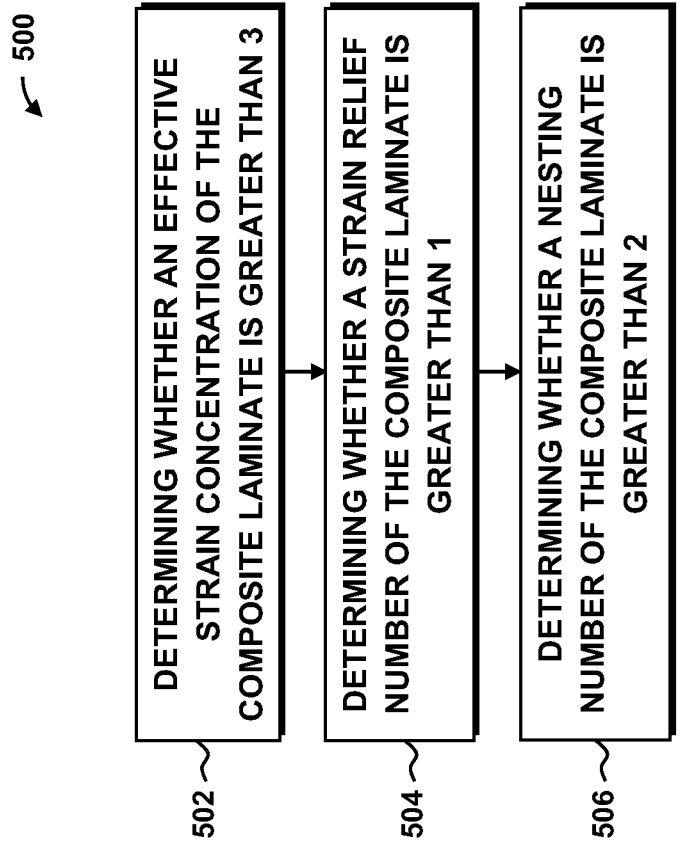
FIG. 20 is a flowchart illustrating one or more steps that may be included in a method of assessing the propensity for ply splitting in a composite laminate.

FIG. 20 is a flowchart illustrating one or more steps that may be included in a method 500 of assessing the susceptibility for ply spitting in a composite laminate 100 subjected to in-plane loading. In the present disclosure, ply splitting 160 (FIG. 13) may be described as a failure mode wherein one or more plies may split along a direction generally parallel to a loading axis 114, as shown in the example 80/10/10 OHT coupon of FIG. 13. Explicit ply splitting may initiate from a cutout such as a hole, and may propagate toward grips, supports, or other non-arresting features in the composite laminate. If a composite laminate passes a ply splitting check, then the strength prediction method 300 may be performed on the composite laminate. In the present disclosure, the ply splitting check includes three conditional statements, all of which must be met for a finding of ply splitting in a composite laminate. The conditional statements involve (1) an effective strain concentration, (2) a congruent strain relief number, and (3) a nesting number of the composite laminate.

Referring to FIG. 20, Step 502 of the ply splitting check method 500 may include determining whether the effective strain concentration ($SC^{eff}$) exceeds a reference value of 3. Effective strain concentration $SC^{eff}$ is defined below in Equation 230. The conditional statement that must be met for ply splitting with regard to effective strain concentration $SC^{eff}$ is indicated below in Equation 240.

$$SC^{eff}=SC-3 \qquad \text{(Equation 230)}$$

$$SC^{eff}>3 \qquad \text{(Equation 240)}$$

Step 502 of the ply splitting check method 500 may include determining the strain concentration factor SC of Equation 230. For a quasi-isotropic, infinite plate with a circular hole under uniaxial load, the strain concentration factor SC may be defined as the ratio of the maximum fiber strain within a ply of the composite laminate divided by a far-field strain in the same ply. Orthotropic laminates that have a difference greater than 3 between the effective strain concentration $SC^{eff}$ and the reference value may be susceptible to splitting.

Step 504 of the ply splitting check method 500 may include determining whether the congruent strain relief number $SRN^c$ of the composite laminate 100 is greater than or equal to 1. As indicated above with regard to Step 320 of FIG. 17 and block 442 of FIG. 18 and provided above in Equation 160, the strain relief number may be described as the sum of the percentage of peak worked maximum ply fiber strains divided by the sum of the percentage of non-worked ply strains. The average tensile failure strain $\overline{\varepsilon^{UNT}_f}$ of a 0° UNT coupon 150 (e.g., FIG. 8) is used to determine whether a ply is worked or non-worked.

As indicated above, plies that involve strain relief are called worked plies. Not all of the worked plies are represented in the numerator of the strain relief number SRN for the ply splitting check. Only the subset of worked plies with the same ply orientation and the greatest sum of strains are used in the numerator of the strain relief number SRN. The subset of worked plies is referred to as the congruent (c) set of worked plies. The denominator of the strain relief number SRN involves all non-worked plies as well worked plies outside of the congruent (c) set. This ratio using the congruent set is referred to as the congruent strain relief number SRN. Equation 250 below is the conditional statement that must be met for ply splitting with regard to congruent strain relief number $SRN^c$, and indicates that a composite laminate 100 may be susceptible to ply splitting if the congruent strain relief number $SRN^c$ is greater than or equal to 1.

$$SRN^c>1 \qquad \text{(Equation 250)}$$

Step 506 of the ply splitting check method 500 may include determining whether a nesting number (NN) of the composite laminate 100 is greater than 2. The nesting number NN considers the total quantity of congruent plies relative to the manner in which the congruent plies are grouped in the stacking sequence of the composite laminate. Determining the nesting number NN requires a local three-dimensional (3D) ply-by-ply analysis which is not a requirement for determining the strain relief number SRN, the strain concentration factor SC, or the first significant event FSE. The mesh of a finite element model for the local 3D ply-by-ply analysis must be stable, as defined above.

The determination of the nesting number NN may include calculating the matrix distortional strain invariants using the local 3D ply-by-ply analysis and sorting into a sorted list based on the maximum strain value for each ply in the laminate. The nesting number NN may be defined as the number of plies in the largest group of congruent plies in the sorted list divided by the number of nests in the original ply stacking sequence. A nest may be defined as 2 or more adjacent plies having the same ply orientation as the largest congruent set in the sorted list.

Equation 260 below is the conditional statement that must be met for ply splitting with regard to nesting number NN, and indicates that a composite laminate 100 may be susceptible to explicit ply splitting at final failure of the composite laminate 100 if the nesting number NN is greater than or equal to 2, and if the above-noted conditional statements are met with regard to strain relief number SRN and strain concentration factor SC.

$$NN \geq 2 \qquad \text{(Equation 260)}$$

Figure 21:
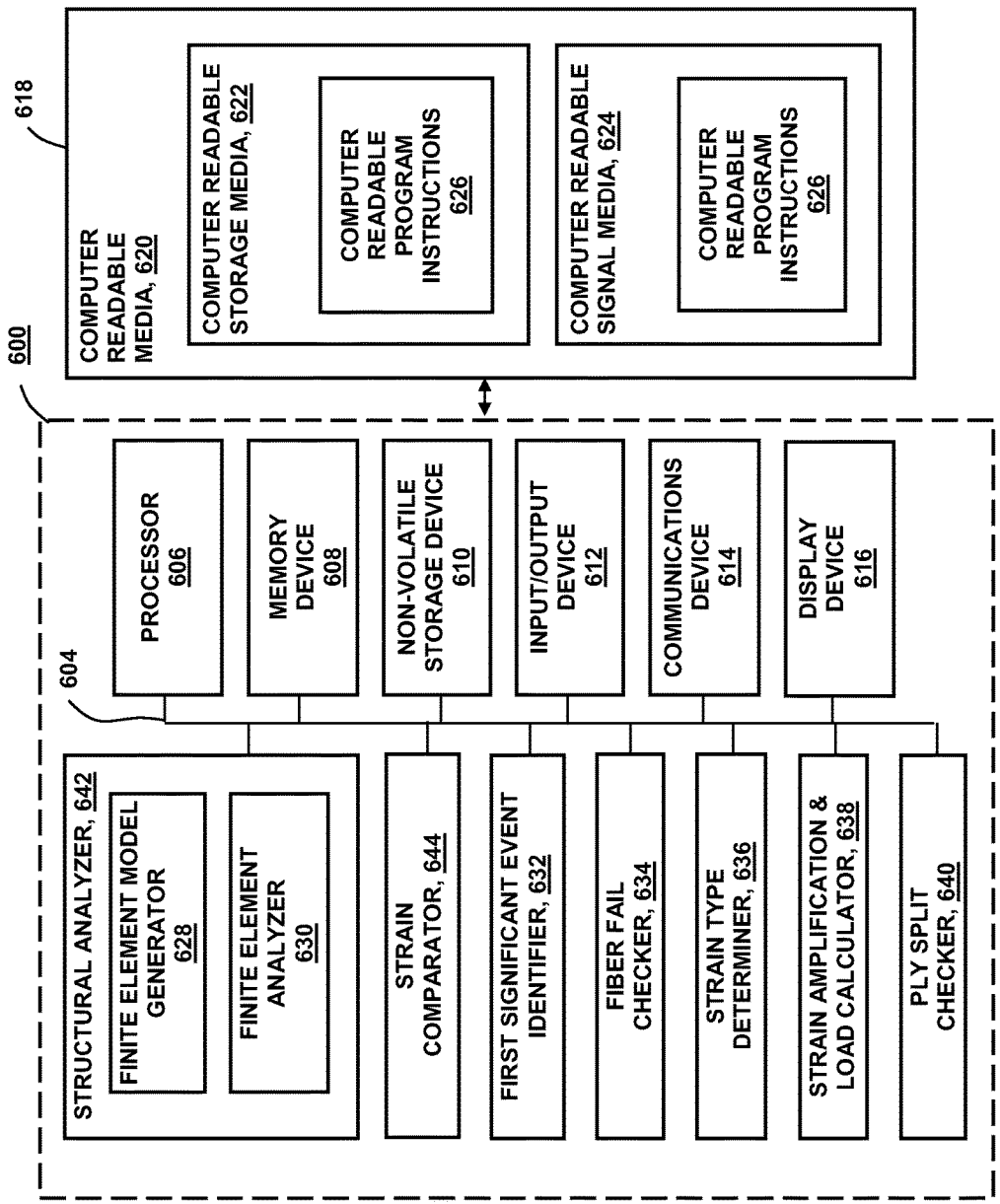
FIG. 21 is a block diagram of an example of a processor-based system for implementing one or more operations of the methods for predicting the strength characteristics of a composite laminate.

Referring now to FIG. 21, the above-described methods, in whole or in part, may be implemented in a computer-implemented process such as on a processor-based system 600 or other suitable computer system. The processor-based system 600 may perform computable readable program instructions 626. The computable readable program instructions 626 may be provided to or loaded onto the processor-based system 600 in order to implement one or more of the above-described operations or steps. In a non-limiting example, the processor-based system 600 and/or the computable readable program instructions 626 may facilitate the generation of an optimized design model for a composite laminate.

The block diagram of FIG. 21 illustrates the processor-based system 600 in an advantageous embodiment for predicting the strength characteristics of a composite laminate 100 including identifying the potential for ply splitting in a composite laminate 100 or identifying the first significant event (FSE) that may lead to a cascading series of material failures within the composite laminate 100 which may lead to structural failure of the composite laminate. The processor-based system 600 may include a data communication path 604 (e.g., a data link) to communicatively couple one or more components to facilitate transfer of data between such components. The communication path 604 may comprise one or more data buses or any other suitable communication path that facilitates the transfer of data between the components and devices of the processor-based system 600.

In a non-limiting embodiment, the components may include one or more of a processor 606, a memory device 608, a non-volatile storage device 610, a communications device 614, an input/output device 612, a display device 616, a structural analyzer 642, a finite element model generator 628, a finite element analyzer 630, a strain comparator 644, a first significant event (FSE) identifier, a fiber fail checker 634, a strain type determiner 636, a strain amplification and load calculator 638, and a ply splitting checker 640.

The structural analyzer 642 may be configured to load a structural model of a composite laminate. In some examples, the structural analyzer 642 may be configured to perform a numerical or analytical structural analysis of the structural model to determine the strain invariants in the composite laminate. In one example, the structural analyzer 642 may include a finite element model generator 628 to generate a finite element model 116 (FIG. 16) of the composite laminate 100 (FIG. 1) for analysis using a finite element analysis program. The finite element model generator 628 may generate a finite element model 116 based on an available computer-aided-design model (not shown) of the composite laminate 100 for analyzing the strength characteristics using a finite element analyzer 630. Alternately, a user may build a finite element model 116 of the structure such as by using the input/output device 612. In some examples, an in-plane analytical structural model of the composite laminate 100 may be analyzed using the structural analyzer 642.

Prior to performing the strength prediction process on the composite laminate, a user may use the input/output device 612 to enter into the structural analyzer 642 strain information (e.g., $\varepsilon_x$, $\varepsilon_y$, $\varepsilon_z$, $\gamma_{xy}$, $\gamma_{yz}$, and $\gamma_{xz}$) obtained from the three (3) above-mentioned coupon tests required for characterizing the three (3) critical strain invariant values ($\varepsilon_{m,dist}^{cr}$, $\varepsilon_{m,dil}^{cr}$, and $\varepsilon_{f,dist}^{cr}$) of each material system from which the composite laminate 100 is formed. In addition, a user may use the input/output device 612 to define boundary conditions and loading conditions for the finite element model 116 for the above-described methods that may be performed by the processor-based system 600.

The structural analyzer 642 (e.g., the finite element analyzer 630) may load the structural model (e.g., the finite element model FEM) of the composite laminate 100. During the loading of the structural model, the strain comparator 644 may compare strain invariants from loading the composite laminate to critical strain invariant values of the material system. In one example, the structural analyzer 642 may load the structural model until an applied matrix strain in the composite laminate 100 first reaches either the critical matrix distortion strain or the critical matrix dilatation strain. The first significant event (FSE) identifier may identify a strain invariant of the matrix and/or the fibers reaching a critical strain invariant value. The first significant event identifier 632 may identify the FSE based on whether fibers can fail during loading of the composite laminate and based on a direction of the strain in the fibers of each ply. The first significant event identifier 632 may be configured to identify a geometric location in the composite laminate the identifying the location of the fibers and/or matrix where the FSE is occurring. The first significant event identifier 632 may also be configured to identify the failure state and the strain value associated with the FSE.

In one example, the first significant event identifier 632 may be configured to identify as a first significant event FSE the strain at which the applied matrix strain or applied fiber strain first reaches a critical strain value. The FSE identifier 632 may identify the FSE for a composite laminate 100 configured as either a traditional laminate 120, a non-traditional laminate 122, or a steered fiber laminate 124. The fiber fail checker 634 may determine whether fibers in the composite laminate 100 can fail when the composite laminate is loaded. For example, the fiber fail checker 634 may determine whether the fibers can fail when the applied matrix strain first reaches the critical matrix dilatation strain. The fiber fail checker 634 may perform a fiber check by determining if the strain along a direction parallel to a fiber (e.g., the axial fiber strain) is greater that the strain along a direction normal to the fiber (e.g., the principal fiber strain). The FSE identifier 632 may identify the critical matrix dilatation strain as the first significant event FSE if the fibers cannot fail. In some examples, if the fiber fail checker 634 determines that at least one of the fibers in the composite laminate 100 can fail, the structural analyzer 642 may load the structural model 115 until at least one ply reaches the critical fiber distortion strain.

The strain type determiner 636 may determine the direction of the strain in each ply by determining whether the fibers are in tension or compression when at least one ply reaches the critical fiber distortion strain. If the composite laminate 100 contains only ply fibers in compression that can fail (e.g., the compression failure state), the FSE identifier 632 may identify the critical fiber distortion strain as the FSE. If the composite laminate 100 contains ply fibers in both compression and tension that can fail (e.g., the combined failure state), the strain amplification and load calculator 638 may calculate the FSE as an amplified strain based upon an appropriate combined strain amplification number. In this regard, the strain amplification and load calculator 638 may calculate a combined strain amplification for the failure sub-state where the compression fibers fail before any tension fibers fail, which is different than the combined strain amplification for the failure sub-state where the tension and compression fibers fail simultaneously, and different than the failure sub-state where the tension fibers fail before any compression fibers fail, as described above.

If the composite laminate 100 contains only ply fibers in tension that can fail (e.g., the tension failure state), the structural analyzer 642 may load the structural model until a ply reaches an equivalent fiber distortion strain. The structural analyzer 642 may determine the equivalent fiber distortion strain as a shell equivalent of the matrix critical distortional strain, based on the above-noted recognition that stretched fibers within a matrix do not immediately unload when fiber distortion failure occurs and, instead, such stretched fibers may unload when local matrix distortion failure occurs. The fiber checker may determine whether fibers in the composite laminate 100 can fail when loaded to the equivalent fiber distortion strain. If the composite laminate 100 contains only ply fibers in tension that can fail when the composite laminate 100 is loaded to the equivalent fiber distortion strain, the strain amplification and load calculator 638 may calculate the strain relief number. The ply splitting checker 640 may calculate the strain relief number as a ratio of a sum of the strain in worked plies of the composite laminate to the sum of the strain in non-worked plies of the composite laminate. Based on the value of the strain relief number, the strain amplification and load calculator 638 may calculate the FSE as an amplified strain based upon an appropriate tension strain amplification number. In this regard, the strain amplification and load calculator 638 may calculate the strain amplification number based on a ratio of the equivalent fiber distortion strain of a first worked ply to a lowest value of the equivalent fiber distortion strain of a non-worked ply.

The ply splitting checker 640 may also be implemented for performing a ply splitting check on the composite laminate 100 to determine whether at least one ply of the composite laminate 100 has the potential for splitting. In this regard, the ply splitting checker 640 may determine whether an effective strain concentration in the composite laminate 100 is greater than 3. In addition, the ply splitting checker 640 may determine whether a congruent strain relief number of the composite laminate 100 is greater than or equal to 1. Furthermore, the ply splitting checker 640 may determine whether a nesting number of the composite laminate 100 is greater than 2. If the above three conditions are met, the ply splitting checker 640 may provide an indication to the display device 616 that the composite laminate 100 has a propensity for splitting.

An output file generator (not shown) may generate an output file representing the results of the strength prediction process and may include the identity of the FSE in the composite laminate. The output file may be configured as a program or computer-readable instructions to be executed by a processor as part of a design optimization process for optimizing the ply layup and/or fiber angles of the composite laminate.

The display device 616 may receive and display the above-mentioned strain invariant values, the results of the fiber checks, the sorted ply listings with corresponding strain magnitudes and directions, the ply failure states and failure sub-states, the strain amplification numbers, the strain relief numbers, and the strain, stress, and/or the applied load on the composite laminate at the FSE. In addition, the display device 616 may receive and display the results of the ply splitting check including the effective strain concentration, the congruent strain relief number, and nesting number of the composite laminate. The display device 616 may receive the above-noted data from one or more of the corresponding components of the processor-based system 600 via the communication path 604. The display device 616 may display the values as a graphical display and/or as numerical values.

In an embodiment, the processor-based system 600 may include one or more of the processors 606 for executing instructions of computable readable program instructions 626 that may be installed into the memory device 608. Alternatively, the processor 606 may comprise a multi-processor core having two or more integrated processors cores. Even further, the processor 606 may comprise a main processor and one or more secondary processors integrated on a chip. The processor 606 may also comprise a many-processor system having a plurality of similarly configured processors.

Referring still to FIG. 21, the processor-based system 600 may further include one or more memory devices 608 which may comprise one or more of volatile or non-volatile storage devices 610. However, the memory device 608 may comprise any hardware device for storing data. For example, the memory device 608 may comprise a random access memory or a cache of an interface and/or integrated memory controller hub which may be included in the communication path 604. The memory device 608 may be configured to permanently and/or temporarily store any one of a variety of different types of data, computer readable code or program instructions 626, or any other type of information. The non-volatile storage device 610 may be provided in a variety of configurations including, but not limited to, a flash memory device, a hard drive, an optical disk, a hard disk, a magnetic tape or any other suitable embodiment for long-term storage. In addition, the non-volatile storage device 610 may comprise a removable device such as a removable hard drive.

The processor-based system 600 may additionally include one or more of the input/output devices 612 to facilitate the transfer of data between components that may be connected to the processor-based system 600. The input/output device 612 may be directly and/or indirectly coupled to the processor-based system 600. The input/output device 612 may facilitate user-input by means of a peripheral device such as a keyboard, a mouse, a joystick, a touch screen and any other suitable device for inputting data to the processor-based system 600. The input/output device 612 may further include an output device for transferring data representative of the output of the processor-based system 600. For example the input/output device 612 may comprise a display device 616 such as a computer monitor or computer screen for displaying results of data processed by the processor-based system 600. The input/output device 612 may optionally include a printer or fax machine for printing a hardcopy of information processed by the processor-based system 600.

Referring still to FIG. 21, the processor-based system 600 may include one or more communications devices 614 to facilitate communication of the processor-based system 600 within a computer network and/or with other processor-based systems. Communication of the processor-based system 600 with a computer network or with other processor-based systems may be by wireless means and/or by hardwire connection. For example, the communications device 614 may comprise a network interface controller to enable wireless or cable communication between the processor-based system 600 and a computer network. The communications device 614 may also comprise a modem and/or a network adapter or any one of a variety of alternative device for transmitting and receiving data.

One or more of the operations of the methods described above with regard to predicting the strength characteristics and/or ply splitting of a composite laminate 100 may be performed by the processor 606 and/or by one or more of the structural analyzer 642, the finite element model generator 628, the finite element analyzer 630, the strain comparator 644, the FSE identifier 632, the strain comparator 644, the fiber fail checker 634, the strain type determiner 636, the strain amplification and load calculator 638, and the ply splitting checker 640, and the output file generator using the computer readable program instructions 626. The computer readable program instructions 626 may comprise program code which may include computer usable program code and computer readable program code. The computer readable program instructions 626 may be read and executed by the processor 606. The computer readable program instructions 626 may enable the processor 606 to perform one or more operations of the above-described embodiments associated with predicting the strength characteristics and/or ply splitting of a composite laminate.

Referring still to FIG. 21, the computer readable program instructions 626 may include operating instructions for the processor-based system 600 and may further include applications and programs. The computer readable program instructions 626 may be contained and/or loaded onto one or more of memory devices 608 and/or non-volatile storage devices 610 for execution by the processor 606 and/or by the structural analyzer 642, the finite element model generator 628, the finite element analyzer 630, the FSE identifier 632, the strain comparator 644, the fiber fail checker 634, the strain type determiner 636, the strain amplification and load calculator 638, and the ply splitting checker 640. As indicated above, one or more of the memory devices 608 and/or non-volatile storage devices 610 may be communicatively coupled to one or more of the remaining components illustrated in FIG. 21 through the communication path 604.

The computer readable program instructions 626 may be contained on tangible or non-tangible, transitory or nontransitory computer readable media 620 and which may be loaded onto or transferred to the processor-based system 600 for execution by the processor 606. The computer readable program instructions 626 and the computer readable media 620 comprise a computer program product 618. In an embodiment, the computer readable media 620 may comprise computer readable storage media 622 and/or computer readable signal media 624.

The computer readable storage media 622 may comprise a variety of different embodiments including, but not limited to, optical disks and magnetic disks that may be loaded into a drive, a flash memory device or other storage device or hardware for transfer of data onto a storage device such as a hard drive. The computer readable storage media 622 may be non-removably installed on the processor-based system 600. The computer readable storage media 622 may comprise any suitable storage media and may include, without limitation, a semiconductor system or a propagation medium. In this regard, the computer readable storage media 622 may comprise electronic media, magnetic media, optical media, electromagnetic media, and infrared media. For example, the computer readable storage media 622 may comprise magnetic tape, a computer diskette, random access memory and read-only memory. Non-limiting examples of embodiments of optical disks may include compact disks-read only memory, compact disks—read/write, and digital video disks.

The computer readable signal media 624 may contain the computer readable program instructions 626 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 21, the computer readable signal media 624 may facilitate the downloading of the computer readable program instructions 626 to the non-volatile storage or other suitable storage or memory device for use within processor-based system 600. For example, the computer readable program instructions 626 contained within the computer readable storage media 622 may be downloaded to the processor-based system 600 over a computer network from a server or client computer of another system.

Any one of a variety of different embodiments of the processor-based system 600 may be implemented using any hardware device or system capable of executing the computer readable program instructions 626. For example, the processor 606 may comprise a hardware unit configured for performing one or more particular functions wherein the computer readable program instructions 626 for performing the functions may be pre-loaded into the memory device 608.

In an embodiment, the processor 606 may comprise an application specific integrated circuit (ASIC), a programmable logic device, or any other hardware device configured to perform one or more specific functions or operations. For example, a programmable logic device may be temporarily or permanently programmed to perform one or more of the operations related to predicting the strength characteristics and/or performing a ply splitting check of a composite laminate. The programmable logic device may comprise a programmable logic array, programmable array logic, a field programmable logic array, and a field programmable gate array and any other suitable logic device, without limitation.

In an embodiment, the computer readable program instructions 626 may be operated by the one or more processor 606 and/or by other devices including one or more hardware units in communication with the processor 606. Certain portions of the computer readable program instructions 626 may be the processor 606 and other portions of the computer readable program instructions 626 may be run by the hardware units.

Advantageously, the various embodiments described above provide the ability to predict the strength characteristics of a composite laminate having a large quantity of composite plies. In addition, the system and method advantageously avoids the need for an extensive coupon testing program, and instead requires only three coupon tests to characterize the material properties which are needed to perform the disclosed strength prediction method. The system and method may advantageously be implemented in a finite element analysis program for predicting the strength characteristics of composite laminates of any size, shape, and configuration, and formed of any number of materials systems. Furthermore, the system and method may be implemented for predicting the strength characteristics of a composite laminate that may be subjected to any one of a variety of different loading conditions, and is not limited to the uniaxial in-plane tension load applied to the OHT laminate in the disclosed example.

The technical effect of performing one or more of the above-described strength prediction methods is a significant increase in the computational efficiency and accuracy in predicting the strength characteristics of composite laminates. The increase in computational efficiency of the strength prediction process allows for a significant increase in the design space of non-traditional laminates 122 (FIG. 2) and steered fiber laminates 124 (FIG. 3).

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of predicting strength characteristics of a composite laminate containing fibers embedded in a matrix, comprising the steps of:

loading a structural model of a composite laminate with one or more design loads, the composite laminate formed of a material system and having a ply layup of plies arranged in a ply stacking sequence;

comparing strain invariants from loading the structural model of the composite laminate to critical strain invariant values of the material system;

determining, if an applied matrix strain reaches a critical matrix dilatation strain, whether fibers can fail by comparing a fiber axial strain to a fiber principal strain, the fiber axial strain oriented parallel to a fiber axis, the fiber principal strain oriented normal to the fiber axis;

loading, if the fibers can fail, the structural model until at least one ply reaches a critical fiber distortion strain and determining whether the fibers in the plies are in tension or compression and whether the fibers can fail;

calculating, if the composite laminate contains fibers in compression that can fail and fibers in tension that can fail, a first significant event (FSE) as an amplified strain, the amplified strain representing a failure strength of the composite laminate in an undamaged condition, the amplified strain being based upon a combined strain amplification number that is a function of critical fiber strain invariant values and is unique to one of the following failure sub-states:
  the compression fibers fail before any tension fibers fail;
  the tension and compression fibers fail simultaneously;
  the tension fibers fail before any compression fibers fail;
  wherein the FSE is a localized deformation of the composite laminate leading to a cascading series of material failures resulting in structural failure of the composite laminate, the FSE representing an analyzed strength of the composite laminate;
iteratively adjusting the ply layup of the composite laminate until converging on a ply stacking sequence for which the analyzed strength representing the FSE of the composite laminate allows the composite laminate to support the one or more design loads without structural failure of the composite laminate; and
constructing a composite laminate having the ply stacking sequence.

2. The method of claim 1, wherein:
the critical strain invariant values further include critical matrix distortion strain and critical fiber distortion strain.

3. The method of claim 1, wherein:
the amplified strain approximates the strain value at a microscopic level.

4. The method of claim 1, further including the step of:
calculating, if the composite laminate contains only ply fibers in tension that can fail when loaded to an equivalent fiber distortion strain, the FSE as an amplified strain based upon a strain relief number and a corresponding tension strain amplification number; and
the composite laminate being susceptible to a failure mode of ply splitting when only tension fibers can fail.

5. The method of claim 4, further including:
calculating the strain relief number as a ratio of a sum of the strain in worked plies of the composite laminate to the sum of the strain in non-worked plies of the composite laminate.

6. The method of claim 4, further including:
calculating tension strain amplification as a ratio of the equivalent fiber distortion strain of a first worked ply to a lowest value of the equivalent fiber distortion strain of a non-worked ply.

7. The method of claim 1, wherein the step of calculating the FSE includes:
identifying a location of the FSE within the composite laminate and a value of the strain invariant corresponding to the FSE.

8. The method of claim 1, further including determining whether the composite laminate is susceptible to a failure mode of ply splitting by:
determining whether an effective strain concentration in the composite laminate is greater than 3;
determining whether a congruent strain relief number of the composite laminate is greater than or equal to 1; and
determining whether a nesting number of the composite laminate is greater than or equal to 2.

9. The method of claim 1, wherein:
the composite laminate is either a traditional laminate, a non-traditional laminate, or a steered fiber laminate.

10. The method of claim 1, wherein:
the composite laminate includes at least two different material systems.

11. A method of predicting strength characteristics of a composite laminate containing fibers embedded in a matrix, comprising the steps of:
loading a finite element model of a composite laminate with one or more design loads until an applied matrix strain reaches either a critical matrix distortion strain or a critical matrix dilatation strain, the composite laminate having a ply layup of plies arranged in a ply stacking sequence;
determining whether fibers in the composite laminate can fail when the applied matrix strain reaches the critical matrix dilatation strain by comparing a fiber axial strain to a fiber principal strain, the fiber axial strain oriented parallel to a fiber axis, the fiber principal strain oriented normal to the fiber axis;
loading, if the fibers can fail, the finite element model until at least one ply reaches a critical fiber distortion strain and determining whether the fibers in each ply are in tension or compression and whether the fibers can fail;
calculating, if the composite laminate contains fibers in compression that can fail and fibers in tension that can fail, a first significant event (FSE) as an amplified strain, the amplified strain representing a failure strength of the composite laminate in an undamaged condition, the amplified strain being based upon a combined strain amplification number that is a function of critical fiber strain invariant values and is unique to one of the following failure sub-states:
  the compression fibers fail before any tension fibers fail;
  the tension and compression fibers fail simultaneously;
  the tension fibers fail before any compression fibers fail;
  wherein the FSE is a localized deformation of the composite laminate leading to a cascading series of material failures resulting in structural failure of the composite laminate, the FSE representing an analyzed strength of the composite laminate;
iteratively adjusting the ply layup of the composite laminate until converging on a ply stacking sequence for which the analyzed strength representing the FSE of the composite laminate allows the composite laminate to support the one or more design loads without structural failure of the composite laminate; and
constructing a composite laminate having the ply stacking sequence.

12. The method of claim 1, wherein:
the plies include fibers embedded in a thermoplastic or thermosetting matrix.

13. The method of claim 1, wherein:
the plies are unidirectional plies containing parallel, continuous reinforcing fibers.

14. The method of claim 1, wherein:
the critical strain invariant values are derived from tensile testing of coupons each formed of the same material system as the composite laminate and differing from one another in fiber angle.

15. The method of claim 14, wherein:
at least one coupon contains fibers oriented non-parallel to a direction of uniaxial tensile loading of the coupon.

16. The method of claim 15, wherein:
none of a plurality of fibers in the at least one coupon extend between grips of a tensile testing machine used to apply uniaxial tensile load to the coupon.

17. The method of claim 14, wherein:
one of the coupons contains composite plies with fibers oriented at 90 degrees relative to a direction of uniaxial tensile loading.

18. The method of claim 14, wherein:
one of the coupons is an open hole tension coupon.

19. The method of claim 1, wherein:
the structural model is one of a finite element model and an in-plane analytical structural model.

20. The method of claim 1, wherein the step of loading the structural model of the composite laminate comprises:
applying a combined tension load and compression load to the composite laminate using a picture frame shear test fixture.

21. The method of claim 7, wherein:
the location of the FSE within the composite laminate is defined as an in-plane location and a through-thickness location of the FSE within the composite laminate.

22. The method of claim 7, wherein:
the location of the FSE is determined by defining a node where the FSE occurs and correlating the node to a geometric location of the FSE.

* * * * *